(12) United States Patent
Yoshino et al.

(10) Patent No.: US 8,270,919 B2
(45) Date of Patent: Sep. 18, 2012

(54) RECEIVING APPARATUS

(75) Inventors: Yoshitaka Yoshino, Tokyo (JP); Chisato Komori, Ishikawa (JP); Koichi Mukai, Ishikawa (JP)

(73) Assignee: Sony Corporation, Tokyo (JP)

( * ) Notice: Subject to any disclaimer, the term of this patent is extended or adjusted under 35 U.S.C. 154(b) by 332 days.

(21) Appl. No.: 12/724,693

(22) Filed: Mar. 16, 2010

(65) Prior Publication Data
US 2010/0248671 A1  Sep. 30, 2010

(30) Foreign Application Priority Data
Mar. 24, 2009 (JP) ................. 2009-072556

(51) Int. Cl.
*H04B 1/16* (2006.01)
(52) U.S. Cl. ............ 455/133; 455/272; 455/277.1
(58) Field of Classification Search ............ 455/550.1, 455/575.1, 130, 132, 133, 134, 135, 269, 455/272, 276.1, 277.1, 277.2
See application file for complete search history.

(56) References Cited

U.S. PATENT DOCUMENTS

| | | | |
|---|---|---|---|
| 5,805,113 A * | 9/1998 | Ogino et al. | 455/276.1 |
| 7,970,366 B2 * | 6/2011 | Arita et al. | 455/130 |
| 2009/0247082 A1 * | 10/2009 | Sathath et al. | 455/41.2 |

FOREIGN PATENT DOCUMENTS
JP    2006-191226 A    7/2000
* cited by examiner

*Primary Examiner* — Thanh Le
(74) *Attorney, Agent, or Firm* — Wolf, Greenfield & Sacks, P.C.

(57) ABSTRACT

A receiving apparatus includes: an electronic device; a first antenna which is provided so as to be separate from a main body of the electronic device and receives broadcast waves; and a power transmission cable which transmits power to the electronic device. In the power transmission cable, a high-frequency blocking section is disposed on the side of a power source, and at least a part of the power transmission cable functions as a second antenna receiving a broadcast wave. The electronic device includes a diversity processor executing a diversity process on a signal received by the first antenna and a signal received by the second antenna.

13 Claims, 37 Drawing Sheets

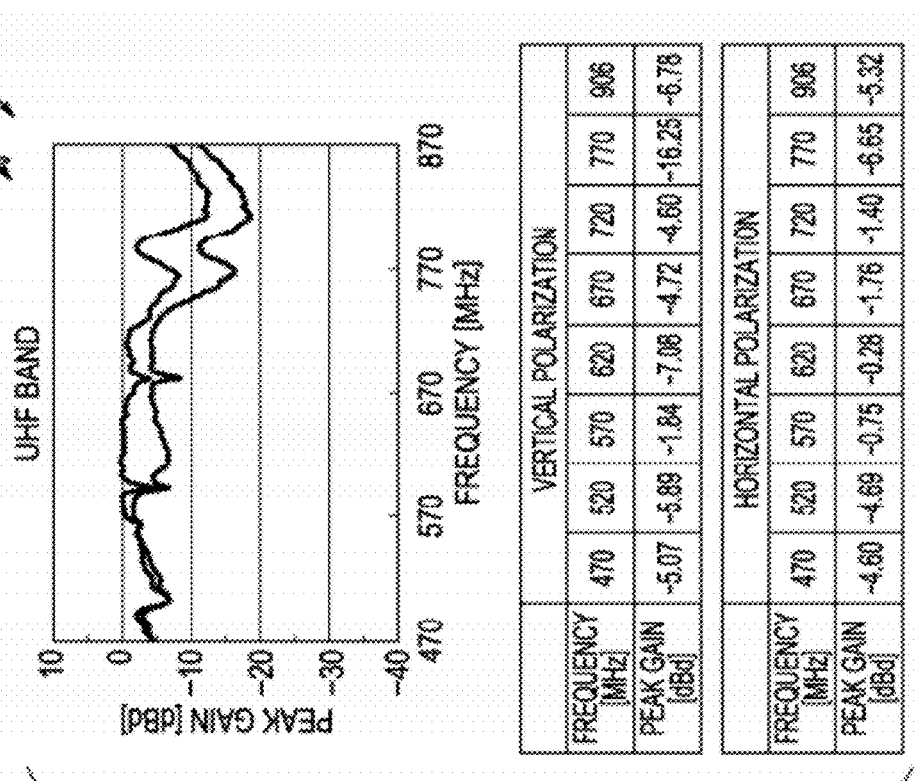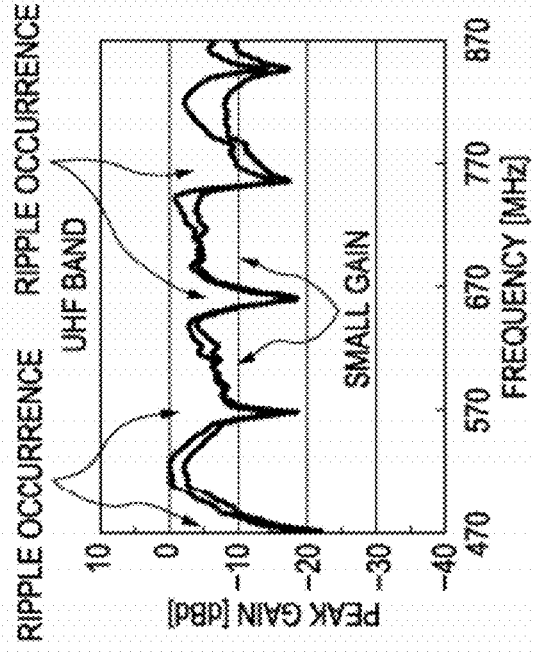

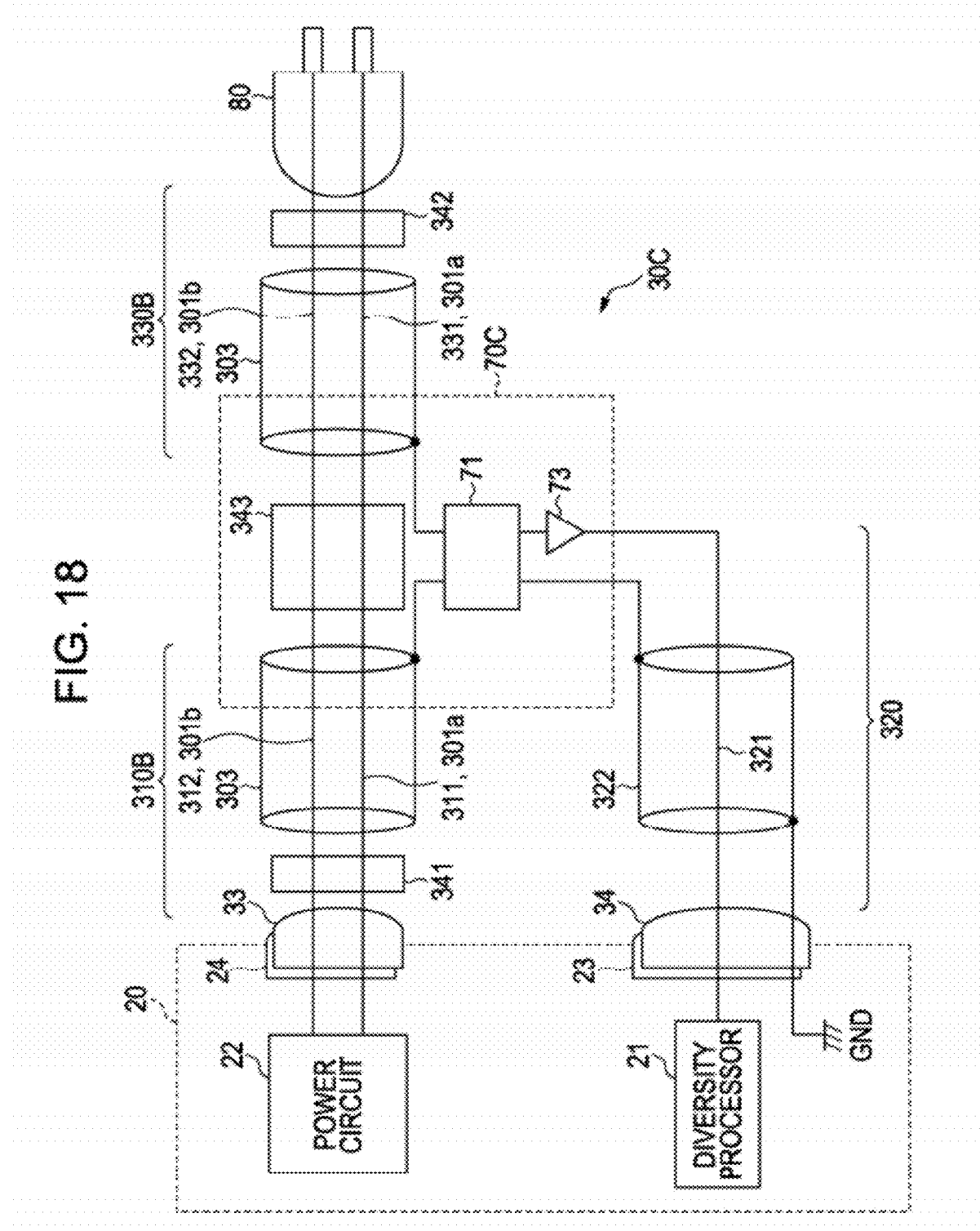

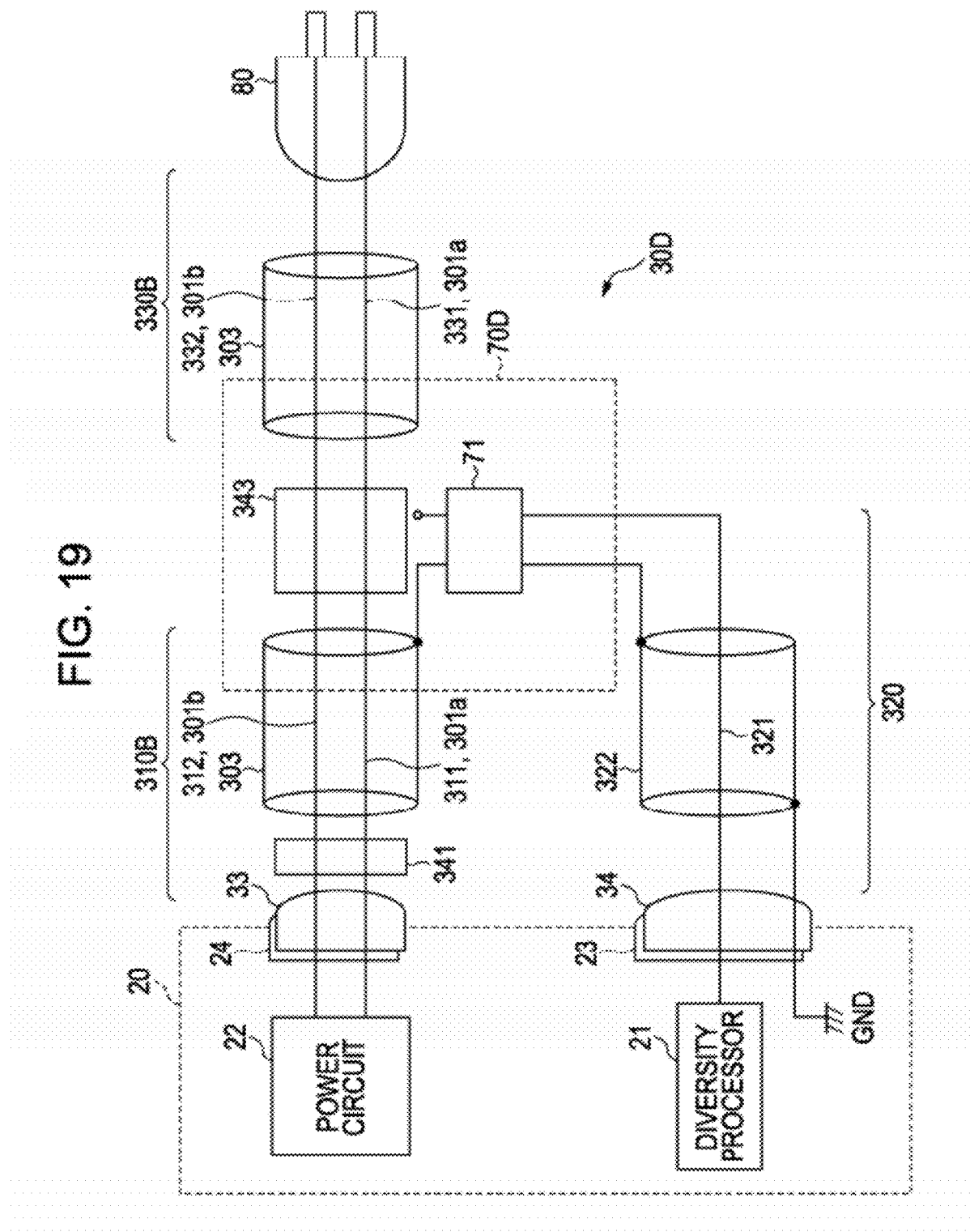

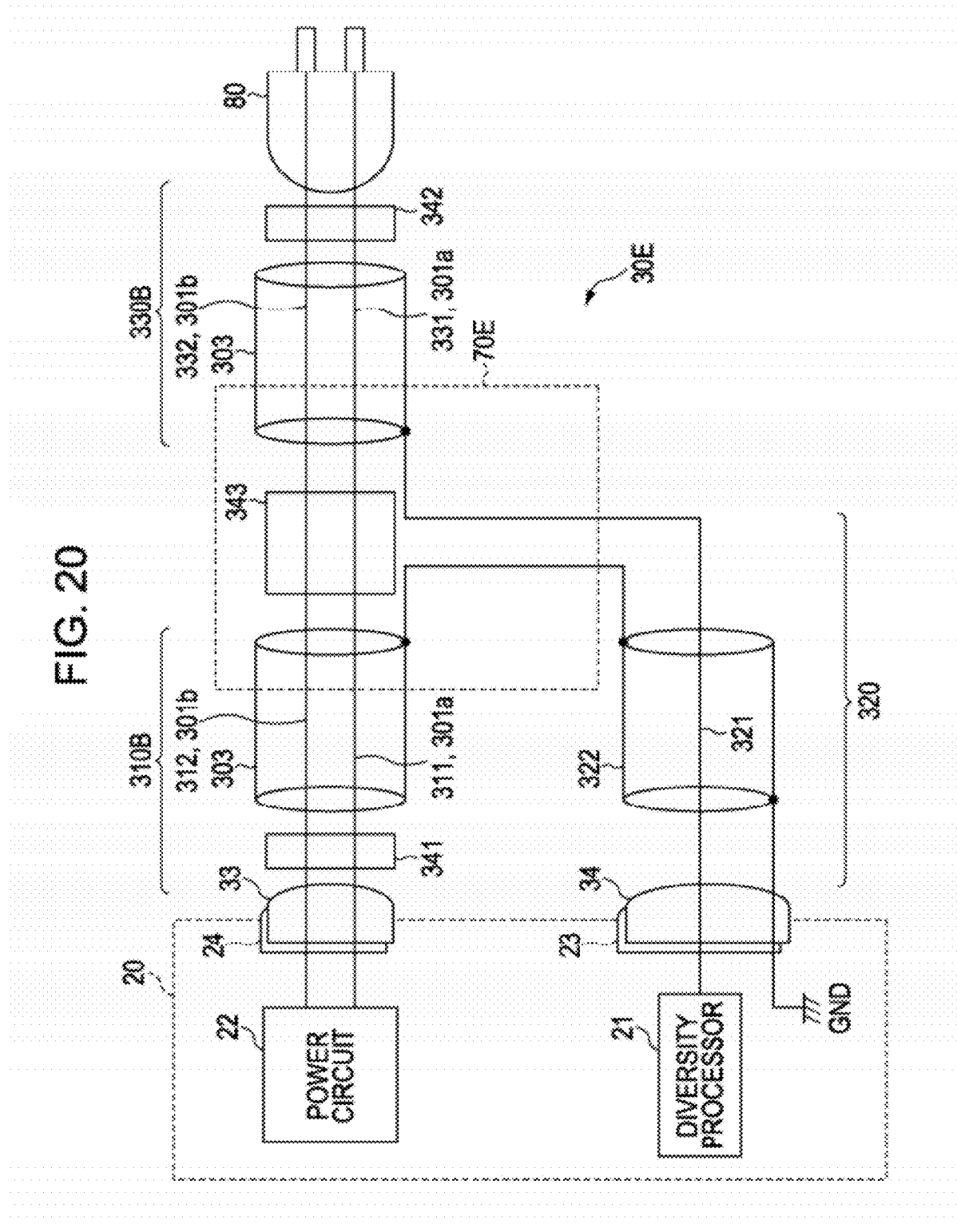

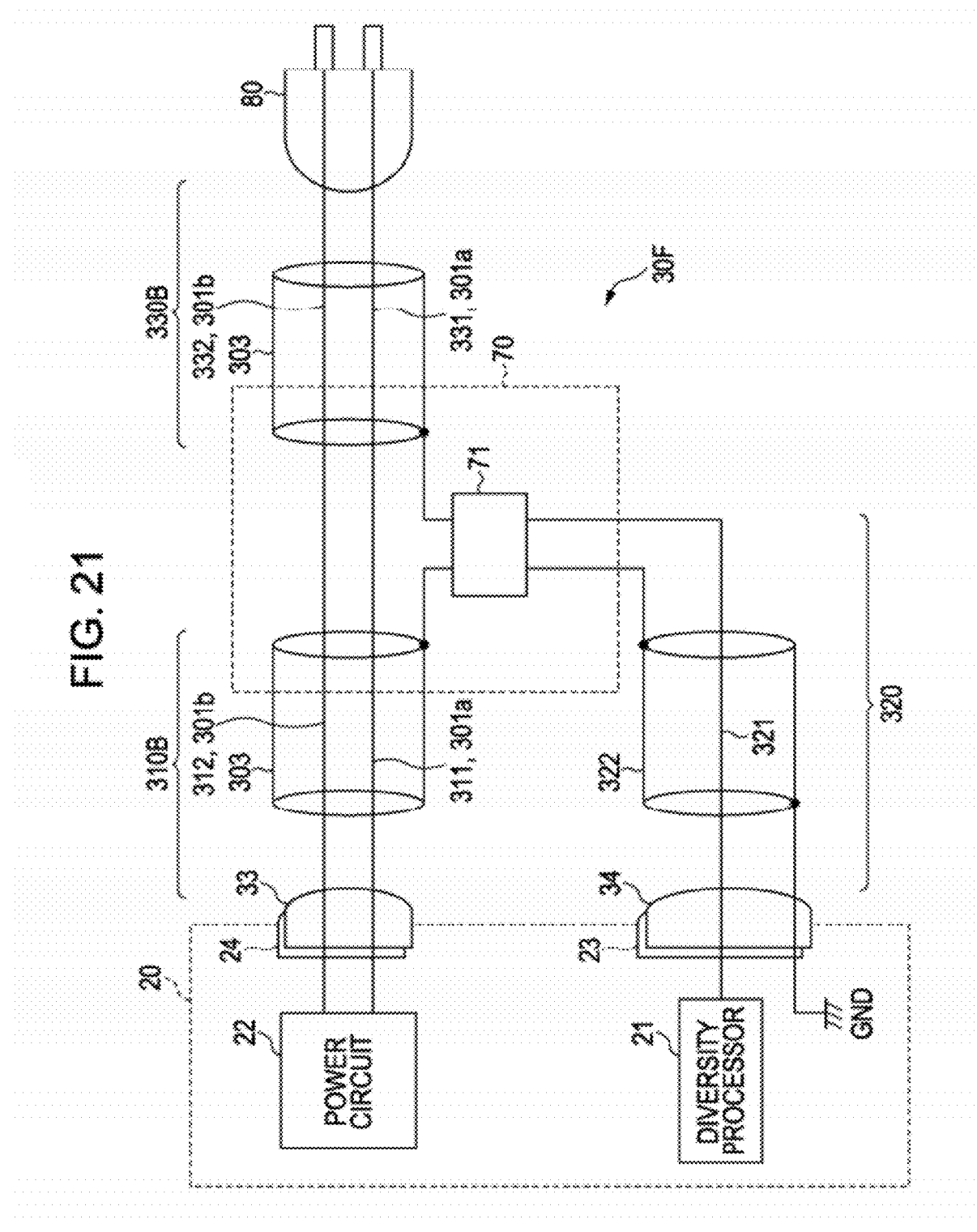

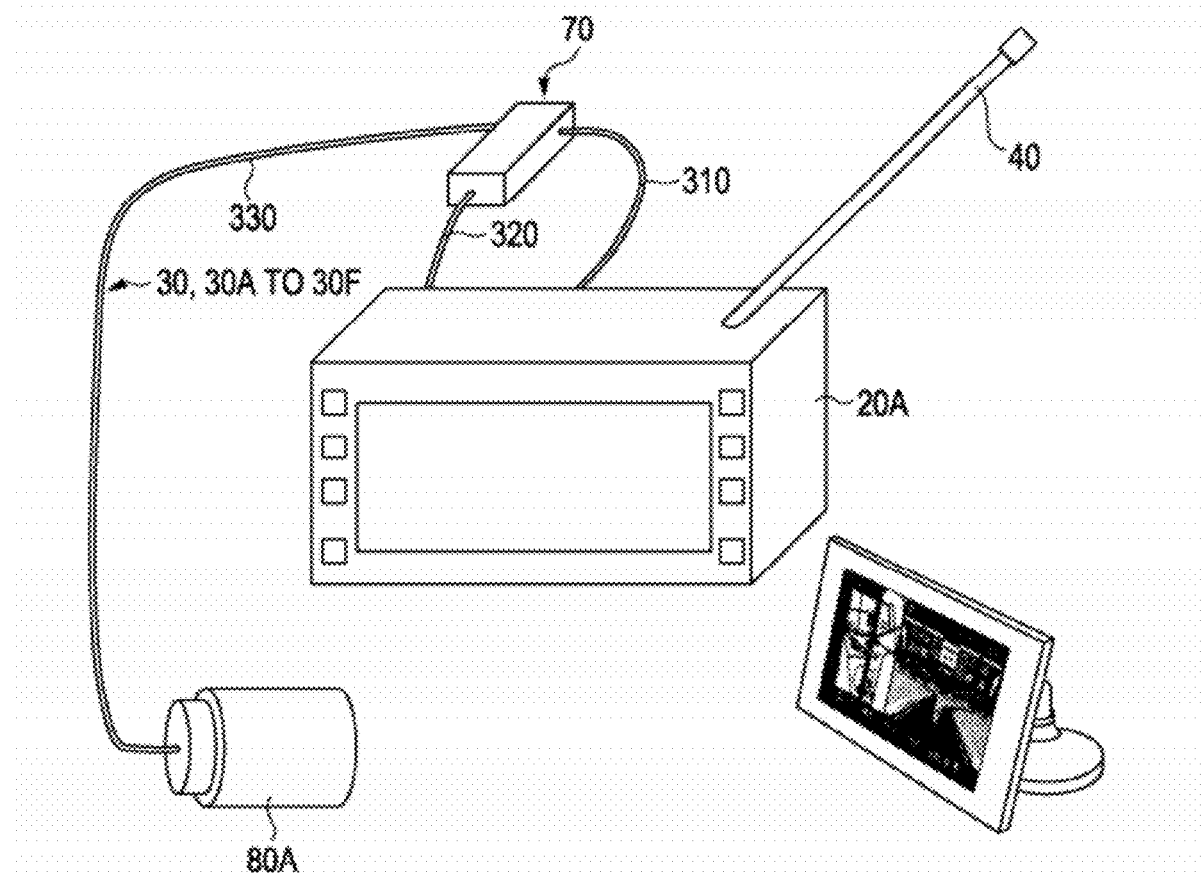

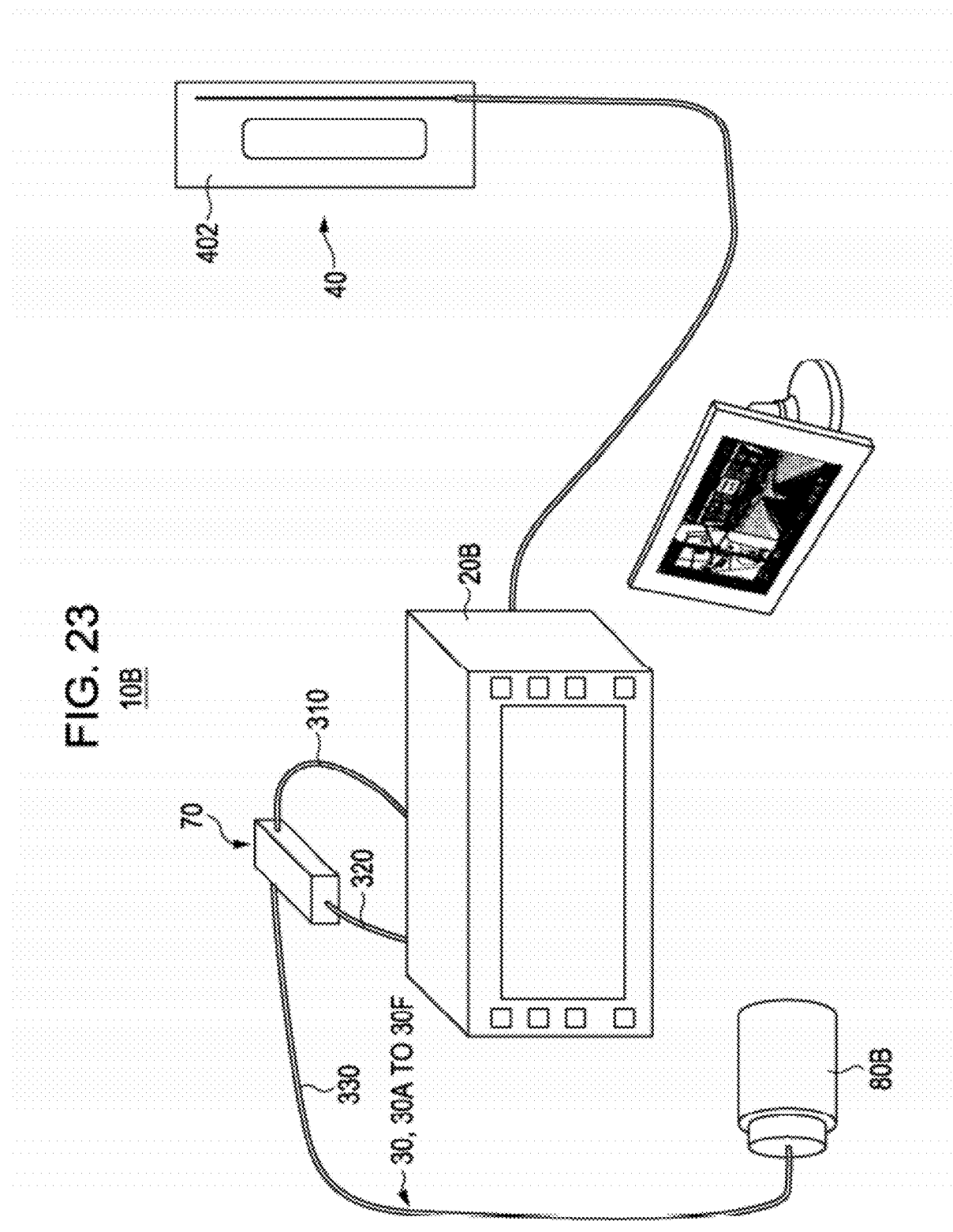

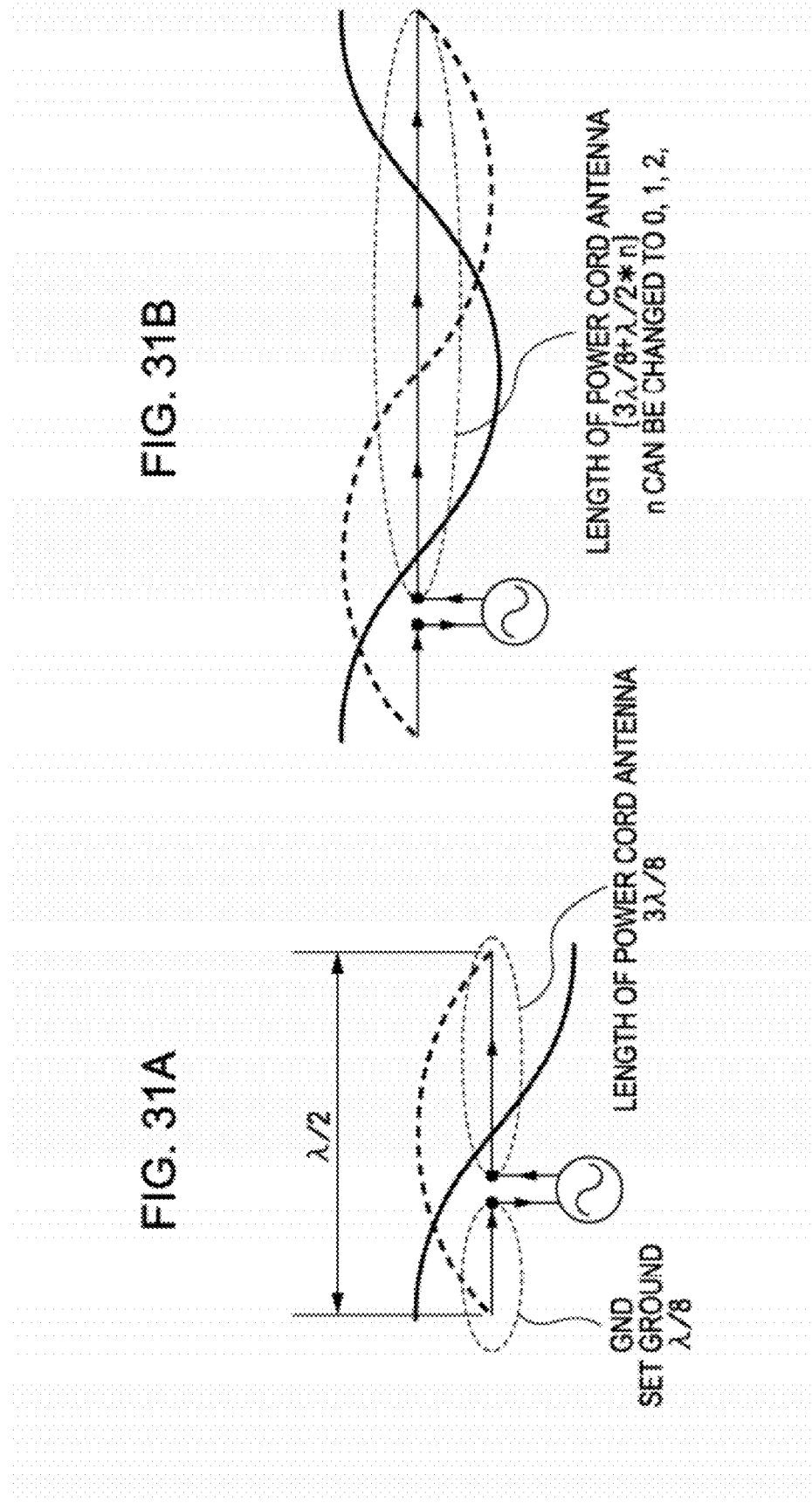

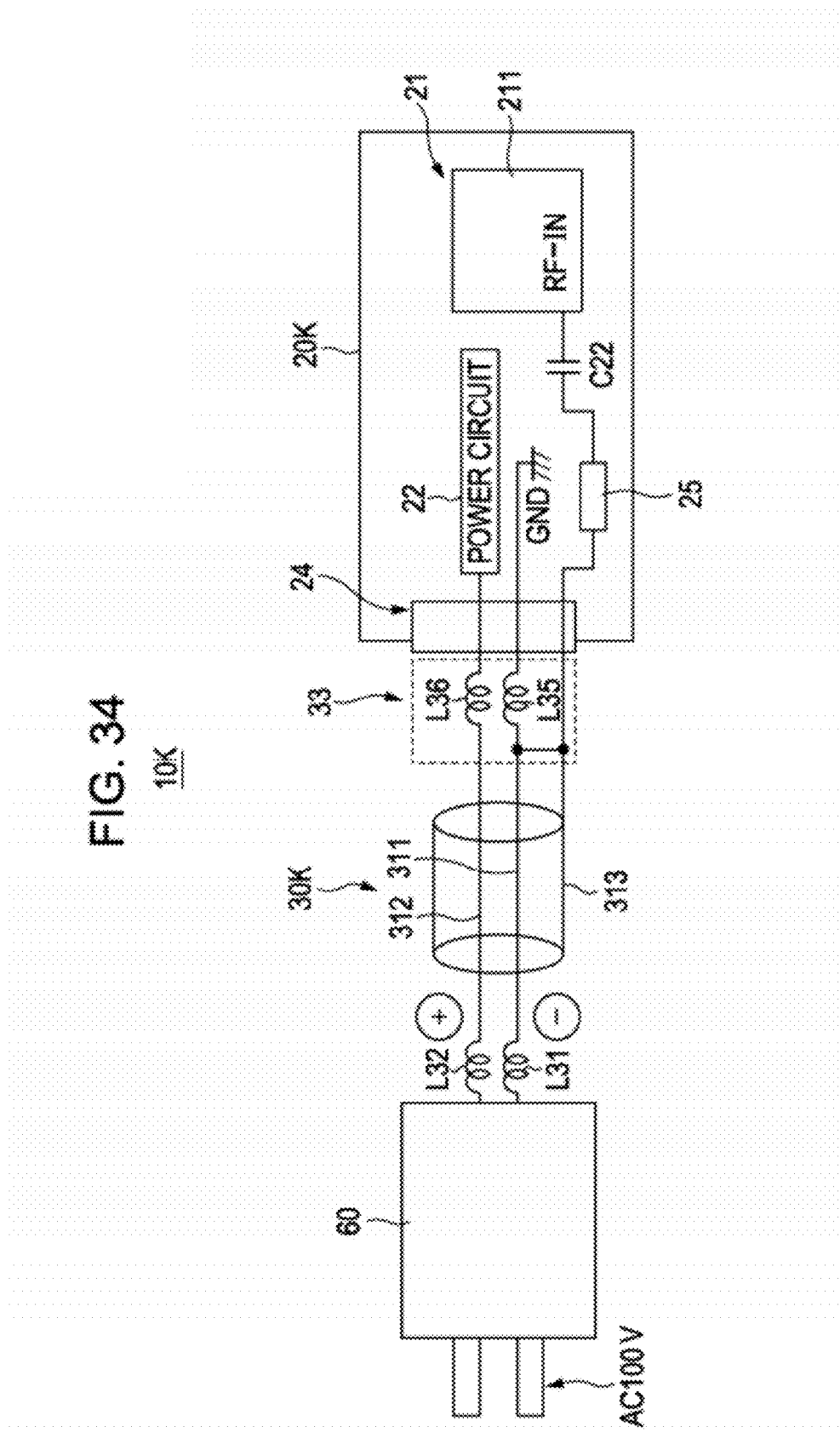

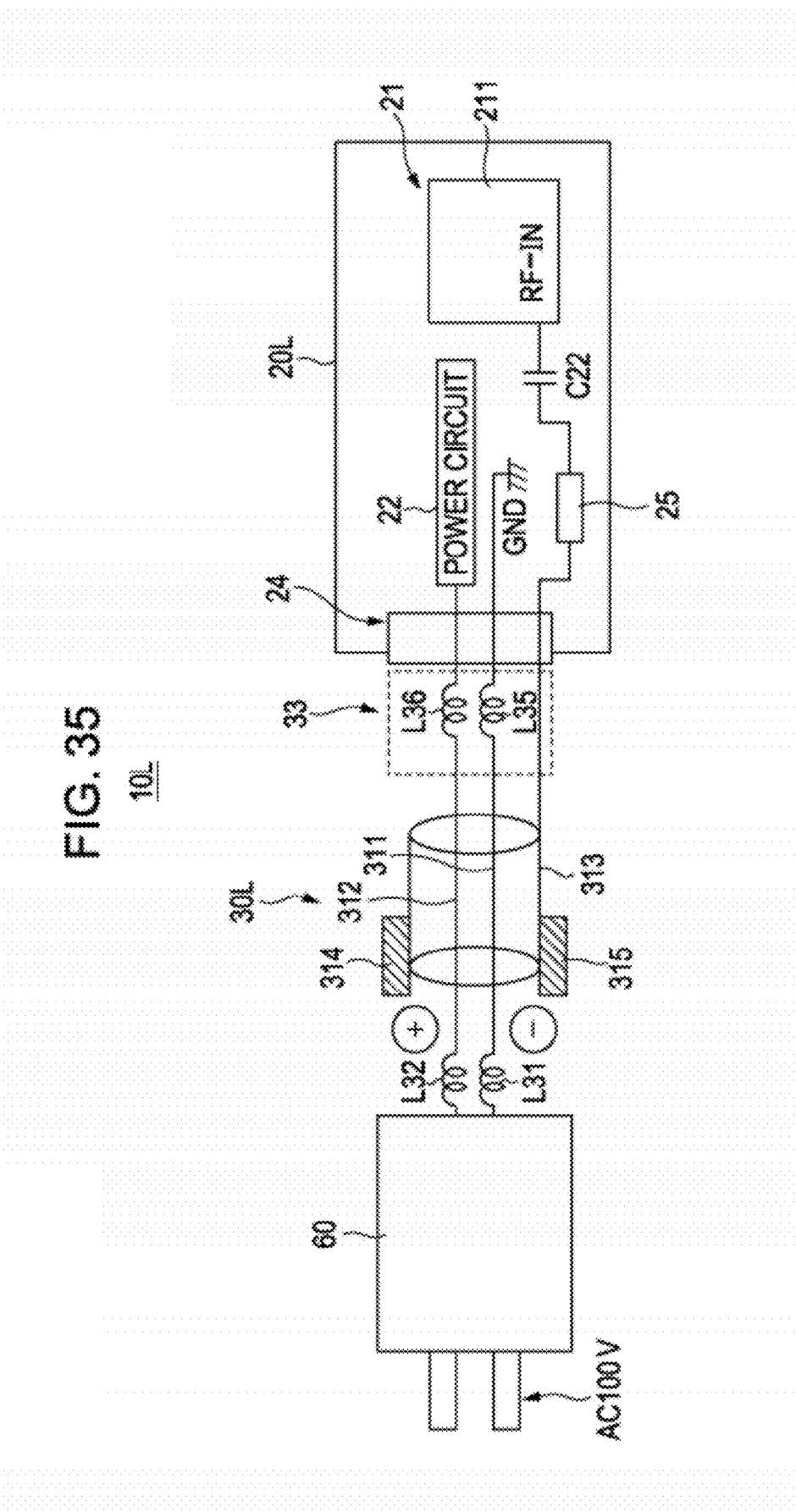

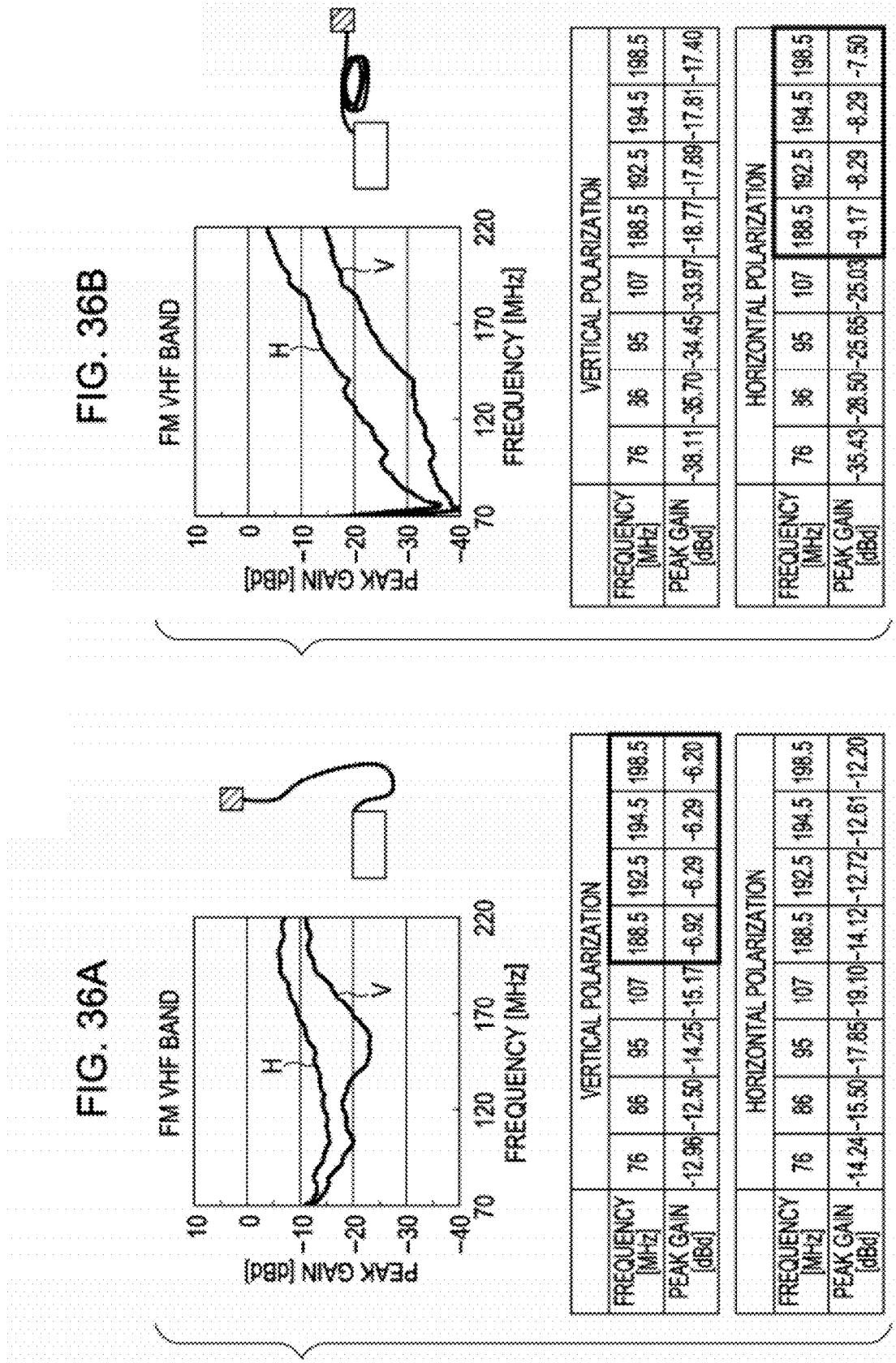

RECEIVING APPARATUS

CROSS REFERENCE TO RELATED APPLICATIONS

The present application claims priority under 35 U.S.C. §119 to Japanese Priority Patent Application JP 2009-072556, filed in the Japan Patent Office on Mar. 24, 2009, the entire contents of which are hereby incorporated by reference.

BACKGROUND OF THE INVENTION

1. Field of the Invention

The present invention relates to a receiving apparatus capable of receiving broadcast waves.

2. Description of the Related Art

A digital broadcast has been initialized to satisfy demand for the effective use of frequency and a high-quality image. However, a receiving system configured to receive the digital broadcast is basically designed to receive signals through the directional Yagi antenna installed in a rooftop or a roof.

In recent years, however, a tuner capable of receiving a high definition (HD) television image has also been mounted in a note-type personal computer (PC) or a compact television. Therefore, demand for viewing the television image even in indoor places has increased.

In a building, however, it is difficult to receive signals stably in a state of unstable waves caused by fading occurring due to a multi path caused by reflection of broadcast waves.

In order to solve this problem, there was suggested a general method called a combination diversity method of simultaneously receiving signals with plural tuners and antennas to cross the signals and supplement lacking information (for example, see Japanese Unexamined Patent Application Publication No. 2006-191226)

SUMMARY OF THE INVENTION

In order to realize the diversity method, two or more antennas are necessary in an electronic device. Therefore, in order to obtain the maximum effect possible, it is preferable that the correlation coefficients of the antennas are low and antenna gain is obtained.

In an electronic device such as a portable phone or a note-type PC, however, it is difficult to mount two antennas due to restrictions on the design or the size.

It is desirable to provide a receiving apparatus capable of improving correlation coefficients of antennas and sufficiently realizing the features of a diversity process.

According to an embodiment of the invention, there is provided a receiving apparatus including: an electronic device; a first antenna which is provided so as to be separate from a main body of the electronic device and receives broadcast waves; and a power transmission cable which transmits power to the electronic device. In the power transmission cable, a high-frequency blocking section is disposed on the side of a power source, and at least a part of the power transmission cable functions as a second antenna receiving a broadcast wave. The electronic device includes a diversity processor executing a diversity process on a signal received by the first antenna and a signal received by the second antenna.

According to the embodiment of the invention, it is possible to improve the correlation coefficients of the antennas and sufficiently realize the features of the diversity process.

BRIEF DESCRIPTION OF THE DRAWINGS

FIGS. 17A and 17B are diagrams illustrating the characteristics of the peak gain with respect to the frequency of the receiving apparatus according to a comparative example and the first embodiment, respectively.

FIG. 18 is a diagram illustrating a second exemplary configuration of the power transmission cable having the function of the second antenna when the first divergence cable and the power source side cable of the power transmission cable are formed by the shield-attached coaxial cable.

FIG. 19 is a diagram illustrating a third exemplary configuration of the power transmission cable having the function of the second antenna when the first divergence cable and the power source side cable of the power transmission cable are formed by the shield-attached coaxial cable.

FIG. 20 is a diagram illustrating a fourth exemplary configuration of the power transmission cable having the function of the second antenna when the first divergence cable and the power source side cable of the power transmission cable are formed by the shield-attached coaxial cable.

FIG. 21 is a diagram illustrating a fifth exemplary configuration of the power transmission cable having the function of the second antenna when the first divergence cable and the power source side cable of the power transmission cable are formed by the shield-attached coaxial cable.

FIG. 22 is a diagram illustrating a first applied example of the receiving apparatus according to the first embodiment other than the television receiver.

FIG. 23 is a diagram illustrating a second applied example of the receiving apparatus according to the first embodiment other than the television receiver.

FIGS. 31A and 31B are diagrams illustrating a first example of the wavelength of a monopole second antenna which does not depend on the set ground of the electronic device.

FIG. 34 is a diagram illustrating the circuit configuration of a receiving apparatus according to a fourth embodiment of the invention.

FIG. 35 is a diagram illustrating the circuit configuration of a receiving apparatus according to a fifth embodiment of the invention.

FIGS. 36A and 36B are diagrams illustrating the characteristics of the peak gain with respect to the frequency of the VHF band of the receiving apparatus in states where the power transmission cable functioning as the monopole second antenna according to the embodiments extends and is wound.

DESCRIPTION OF THE PREFERRED EMBODIMENTS

Hereinafter, preferred embodiments of the invention will be described with reference to the drawings.

The description will be made in the following order.

1. First Embodiment (First Exemplary Configuration of Receiving Apparatus)
2. Second Embodiment (Second Exemplary Configuration of Receiving Apparatus)
3. Third Embodiment (Third Exemplary Configuration of Receiving Apparatus)
4. Fourth Embodiment (Fourth Exemplary Configuration of Receiving Apparatus)
5. Fifth Embodiment (Fifth Exemplary Configuration of Receiving Apparatus)

1. First Embodiment

Figure 1:
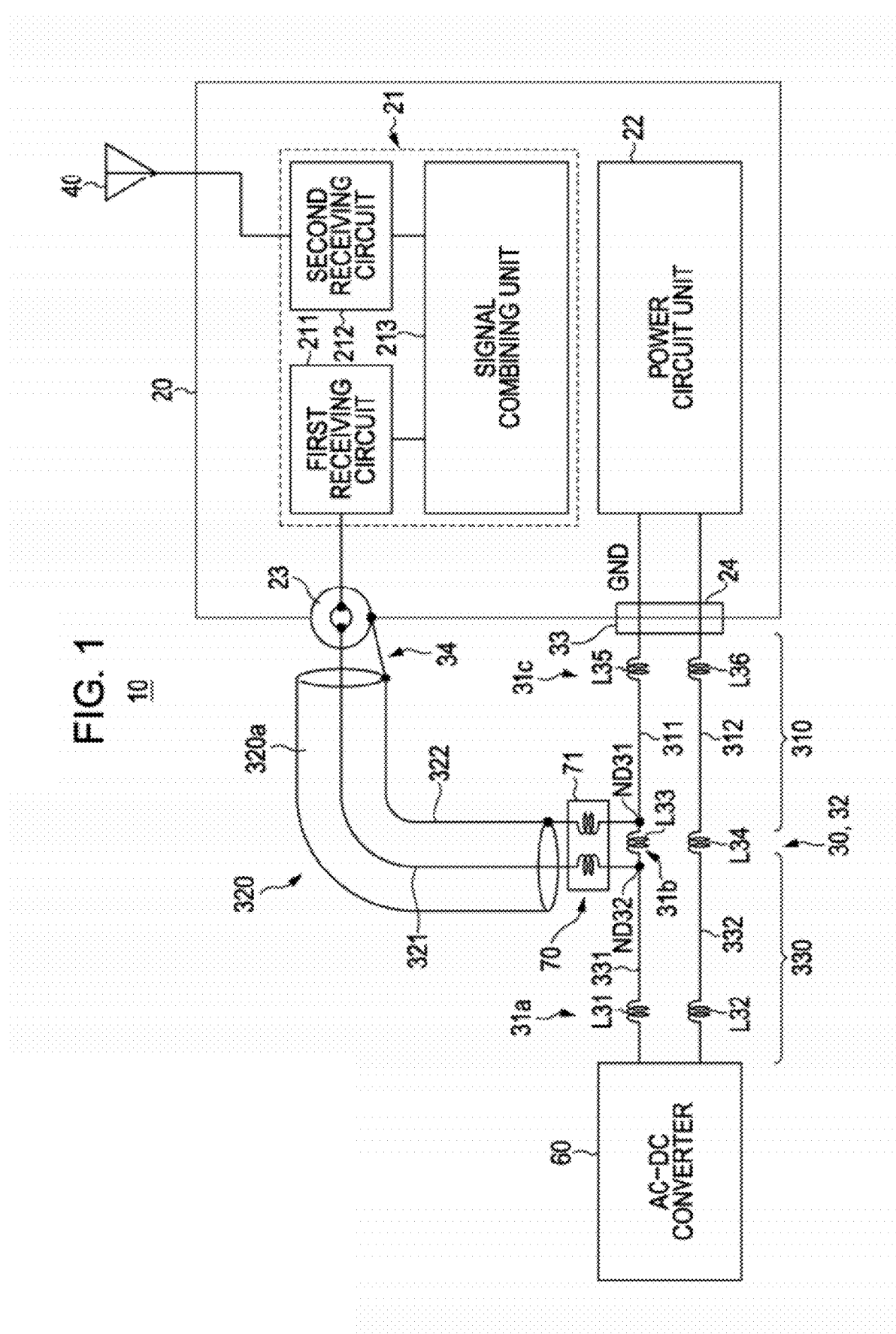
FIG. 1 is a diagram illustrating the circuit configuration of a receiving apparatus according to a first embodiment of the invention.

FIG. 1 is a diagram illustrating the circuit configuration of a receiving apparatus according to a first embodiment of the invention.

Figure 2:
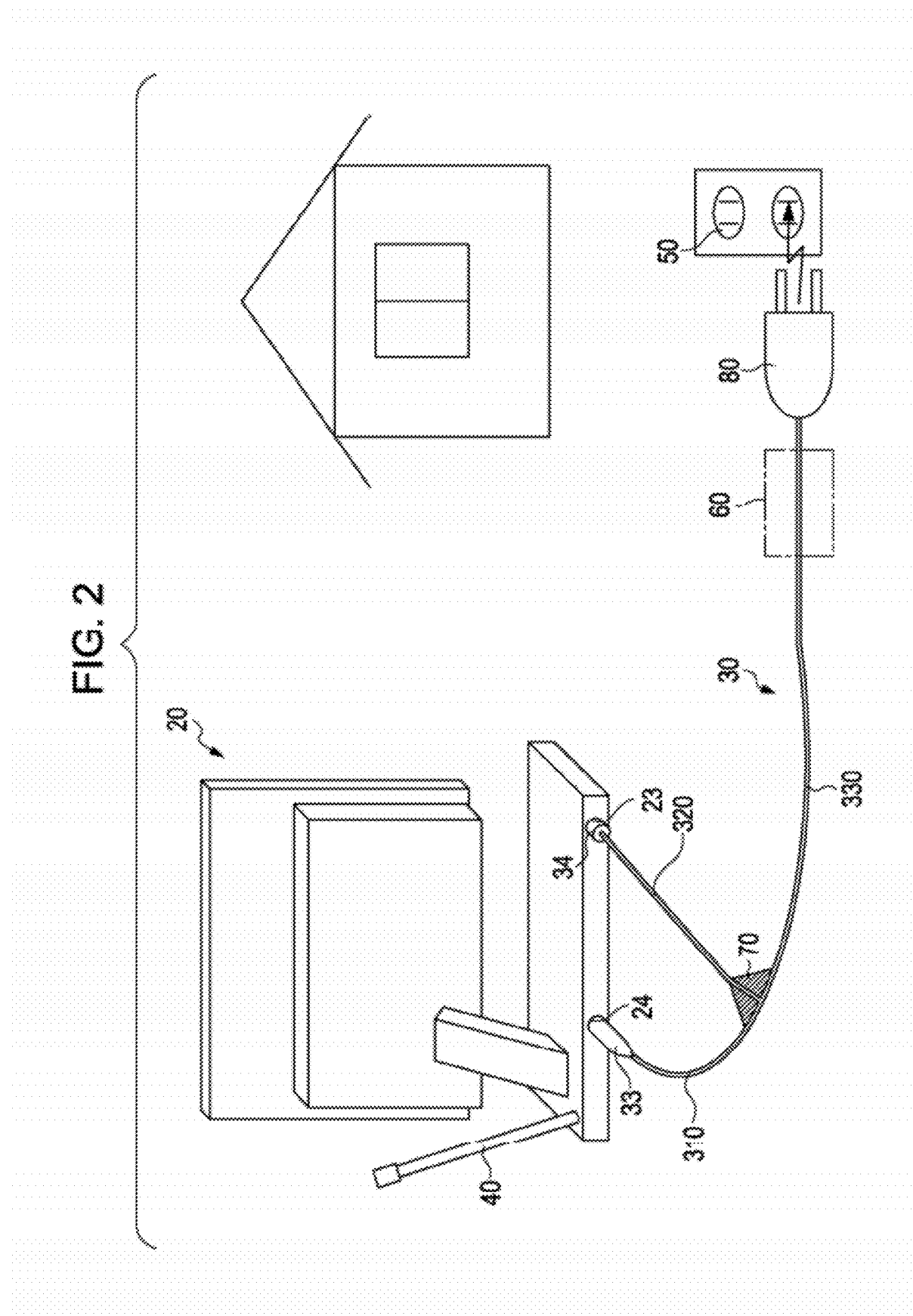
FIG. 2 is a diagram illustrating the concept of the receiving apparatus according to the embodiment of the invention.

FIG. 2 is a diagram illustrating the concept of the receiving apparatus according to the embodiment of the invention.

A receiving apparatus 10 according to the first embodiment includes an electronic device 20, a power transmission cable (power supply cord) 30 transmitting power to the electronic device 20, and a first antenna 40 separate from the main body of the electronic device. In FIG. 1, Reference Numeral 50 denotes a power source socket. In FIG. 1, Reference Numeral 60 denotes an AC-DC converter.

In FIG. 2, a television receiver is shown as an example of the electronic device 20. Here, a general television receiver is exemplified for easy understanding. A compact electronic device such as a portable phone, a note-type PC, or a PND (Personal Navigation Device) with television function may be used as the electronic device 20.

In the power transmission cable 30 according to this embodiment, a high-frequency blocking section 31$a$, which is provided so as to be separate from a high frequency, that is, may transmit power with no problems even in high impedance at the high frequency, is disposed so as to be close to the power source socket 50.

A part or the whole of the power transmission cable 30 functions as a second antenna 32 receiving radio signals or television signals.

The electronic device 20 includes a diversity processor 21, a power circuit 22 transmitting power to each unit of the electronic device 20, a high-frequency connector 23, and a power plug 24.

The diversity processor 21 has a function of executing a diversity process of combining a signal received through the first antenna 40 and a signal received through the second antenna 32.

FIG. 2 is the diagram illustrating the television receiver serving as the electronic device 20 according to the first embodiment of the invention, when viewed from the rear surface thereof.

The high-frequency connector 23 and the power plug 24 are disposed on the rear surface of the electronic device 20 serving as the television receiver.

The power transmission cable 30 is diverged into two lines, that is, a first divergence cable 310 and a second divergence cable 320 by a divergence section (also referred to as a relay section) 70 disposed on the way from the power source socket 50 to the electronic device 200.

A power jack 33 is disposed in the front end of the first divergence cable 310. The power jack 33 is connected to the power plug 24 of the electronic device 20 so as to be connected to the power circuit 22 of the electronic device 20.

The second divergence cable 320 serves as a high-frequency signal transmission line 320a. A connector 34 is disposed on the front end of the high-frequency signal transmission line 320a, so that the connector 34 is connected to the high-frequency connector 23 of the electronic device 20 so as to be connected to the diversity processor 21.

The second antenna 32 according to the first embodiment has a substantial T-shaped dipole structure formed by the power source side cable 330 closer to the power source socket with reference to the divergence section (relay section) 70 and the first divergence cable 310.

The power transmission cable 30 has a plug 80 formed in the end opposite to the electronic device 20. The plug 80 is connected to the household power source socket 50, for example, to supply power to the electronic device 20.

The diversity processor 21 of the electronic device 20 includes a first receiving circuit 211, a second receiving circuit 212, and a signal combining unit 213.

The electronic device 20 includes the power circuit 22 transmitting power to each unit and the diversity processor 21 serving as a signal receiving unit, as described above.

In the diversity processor 21 serving as the signal receiving unit, the first receiving circuit 211 and the second receiving circuit 212 are separately disposed and the output lines thereof are connected to the signal combining unit 213.

The arbitrary first antenna 40 is connected to the second receiving circuit 212 and the high-frequency connector 23 is connected to the first receiving circuit 211.

The AC-DC converter 60 is connected to the power circuit 22 via the power transmission cable 30, for example.

Inductors L31 to L36 serving as high-frequency blocking sections 31a, 31b, and 31c and the relay section (the divergence section) 70 connected to the high-frequency signal transmission line 320a are disposed in the AC-DC converter 60 or in the midway of the power transmission cable 30.

In some cases, a balanced-to-unbalanced transformer (balun) 71 is disposed in the relay section 70. Therefore, by disposing the balun, it is possible to block unbalanced current flowing in the high-frequency signal transmission line 320a. Accordingly, it is possible to reduce the influence of a previously generated electric field.

The high-frequency signal transmission line 320a is connected to the first receiving circuit 211 of the electronic device 20 via the high-frequency connector 23.

In the receiving apparatus 10 in FIG. 1, the first divergence cable 310 and the power source side cable 330 of the power transmission cable 30 are formed by two parallel lines and the high-frequency signal transmission line 320a is formed by a coaxial shielded cable.

The first divergence cable 310 has parallel lines 311 and 312. The power source side cable 330 has two parallel lines 331 and 332.

The inductors L35 and L36 forming the high-frequency blocking section 31c are disposed at one ends (close to the power jack 33) of the parallel lines 311 and 312 of the first divergence cable 310, respectively.

The inductors L31 and L32 forming the high-frequency blocking section 31a are disposed at one ends (close to the AC-DC converter 60) of the parallel lines 331 and 332 of the power source side cable 330, respectively.

The other end of the parallel line 311 of the first divergence cable 310 and the other end of the parallel line 331 of the power source side cable 330 are connected to the inductor L33 forming the high-frequency blocking section 31b. Nodes ND31 and ND32 are formed at the connection point.

The other end of the parallel line 312 of the first divergence cable 310 and the other end of the parallel line 332 of the power source side cable 330 are connected to the inductor L34 forming the high-frequency blocking 31b.

The parallel line 311 of the first divergence cable 310 is connected to a set ground GND of the electronic device 20. Accordingly, the parallel line 331 of the power source side cable 330 is also connected to the set ground GND.

The high-frequency signal transmission line 320a formed by the coaxial shielded cable has a core line 321 and a shield portion 322 formed in the circumference with an insulating material interposed therebetween.

The entire coaxial shielded cable is covered with an insulating sheet (an outer surface or a jacket) in addition to the shield portion 322.

The node ND32 connected with the inductor L33 of the parallel line 331 of the power source side cable 330 is connected to the core line 321 of the high-frequency signal transmission line 320a formed by the coaxial shielded cable via the balun 71.

The node ND31 connected with the inductor L33 of the parallel line 311 of the first divergence cable 310 is connected to the shield portion 322 of the high-frequency signal transmission line 320a formed by the coaxial shielded cable via the balun 71.

Figure 3:
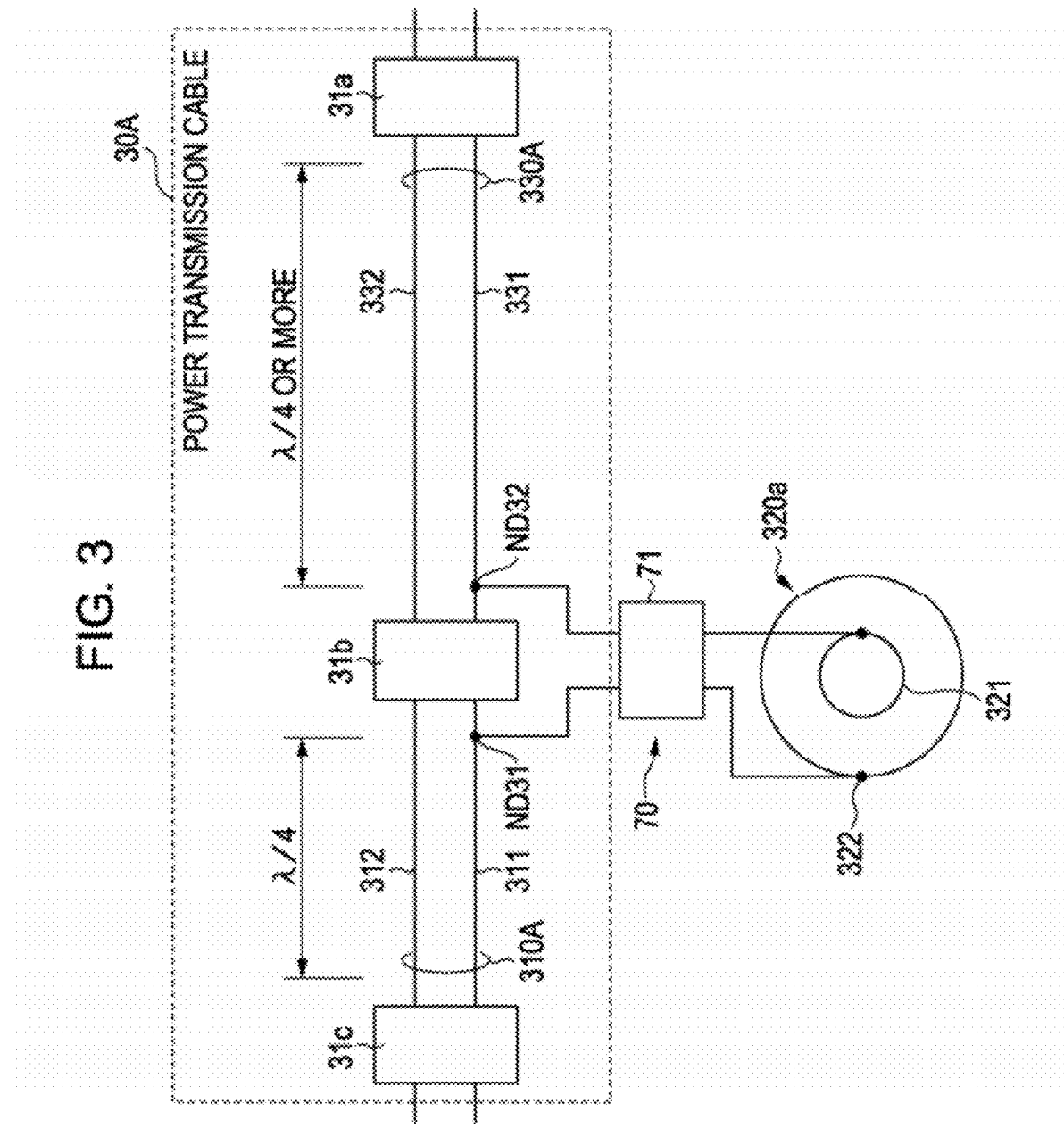
FIG. 3 is a diagram illustrating the representative exemplary configuration of a second antenna formed by a power transmission cable according to the first embodiment.

FIG. 3 is a diagram illustrating the representative exemplary configuration of the second antenna formed by the power transmission cable according to the first embodiment.

A power transmission cable 30A is diverged into four lines by the high-frequency blocking sections 31a to 31c formed by the inductors at a high-frequency.

In the power transmission cable 30A in FIG. 3, a first divergence cable 310A is configured to have a length of an odd-number multiple of ¼ of the electric field of a desired reception frequency. The length of the first divergence cable 310A in FIG. 3 is set to ¼ wavelength (λ) of the wavelength of the central frequency in the VHF band, for example.

The length of the power source side cable 330A is set to have a length equal to or larger than the length of the first divergence cable 310A.

In this way, in the power transmission cable 30A, the relay section 70 is disposed at the position close to the electronic device 20 with reference to the center of the power transmission cable 30A.

As a consequence, in the power transmission cable 30A, the length of the first divergence cable 310A is set to 150 [mm], for example, and the length of the power source side cable 330A is set to 1000 [mm]. The entire length of the power transmission cable 30A is 1200 [mm].

The frequency of the MVHF (Modified VHF; VHF or FM VHF) band is in the range from 30 MHz to 300 MHz. The frequency of the UHF band is in the range from 300 MHz to 3000 MHz. The frequency of the terrestrial digital television is in the range from 470 MHz to 770 MHz.

The power transmission cable 30A is diverged into four lines by the high-frequency blocking sections, but may be diverged into at least two lines in order to exert the minimum function.

As described above, the end of the first divergence cable 310A and the end of the power source side cable 330A are connected to the relay section 70. The high-frequency signal resonating in the first divergence cable 310A and the power source side cable 330A is transmitted to the first receiving circuit 211 of the electronic device 20 via the relay section 70 and the high-frequency signal transmission line 320a.

Next, the interference and portability of two antennas will be described.

Figure 4:
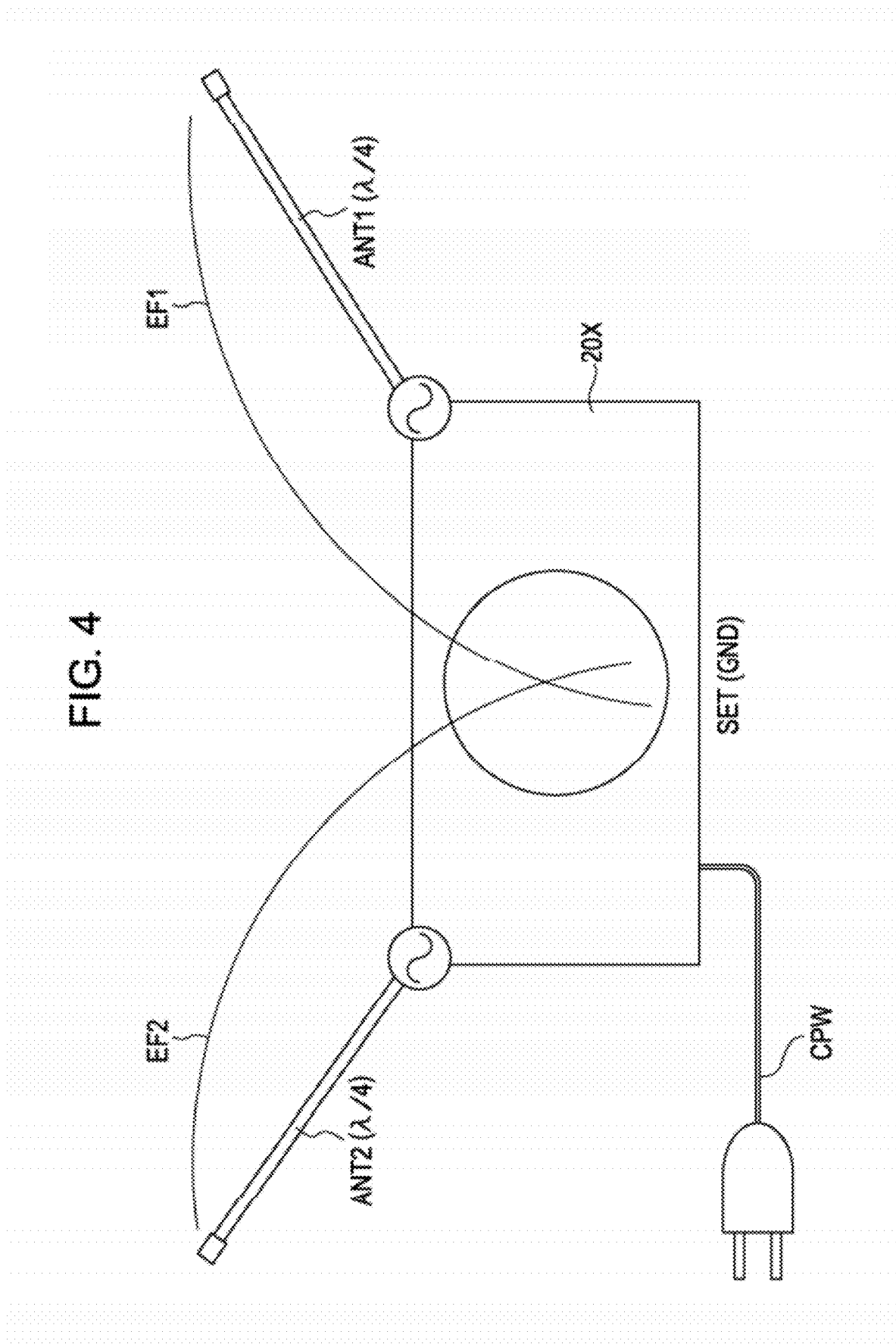
FIG. 4 is a diagram illustrating an example of an unbalanced antenna installed in an electronic device.

FIG. 4 is a diagram illustrating unbalanced antennas installed in the electronic device.

In FIG. 4, unbalanced antennas ANT1 and ANT2 are installed in an electronic device 20X.

In this case, when the size of the set ground GND is smaller than the wavelength, an electric field EF1 generated by an antenna ANT1 and an electric field EF2 generated by an antenna ANT2 in the set ground GND interfere with each other. Accordingly, a correlation efficient deteriorates.

However, when either the antenna ANT1 or the antenna ANT2 is equal to or larger than $\lambda/2$, no problem occurs.

In the example of FIG. 4, good portability is achieved.

Figure 5:
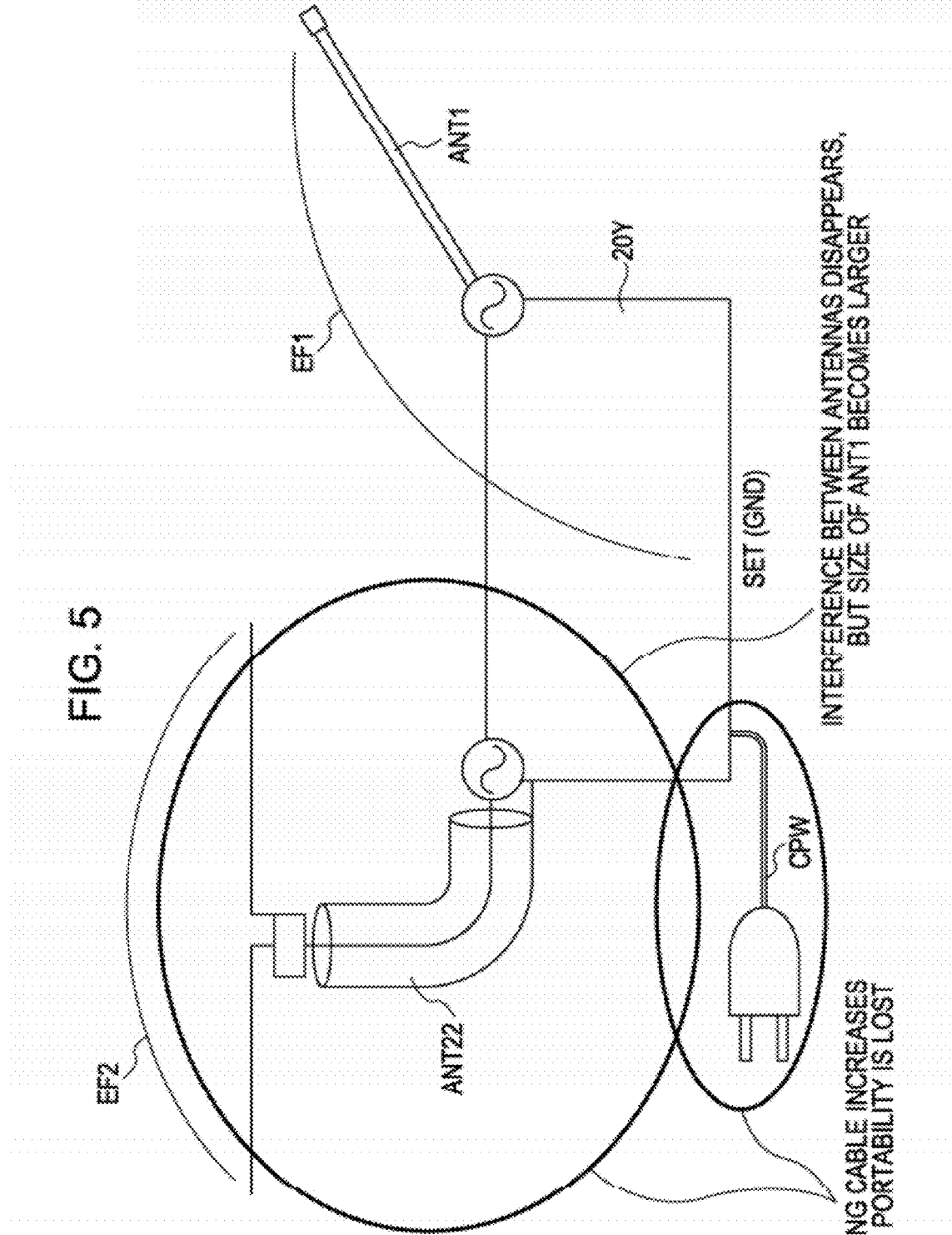
FIG. 5 is a diagram illustrating an unbalanced antenna and a balanced antenna installed in the electronic device.

FIG. 5 is a diagram illustrating an unbalanced antenna and a balanced antenna installed in the electronic device.

In FIG. 5, an unbalanced antenna ANT1 and a balanced antenna ANT22 formed by a coaxial cable are installed in an electronic device 20Y.

In this case, even when the size of the set ground GND is smaller than the wavelength, an electric field EF1 generated by an antenna ANT1 and an electric field EF2 generated by an antenna ANT2 in the set ground GND do not interfere with each other. Accordingly, the correlation efficient does not deteriorate.

However, since the size of the antenna ANT2 becomes larger, a connecting cable including a power cord CPW increases. Therefore, portability is lost.

Figure 6:
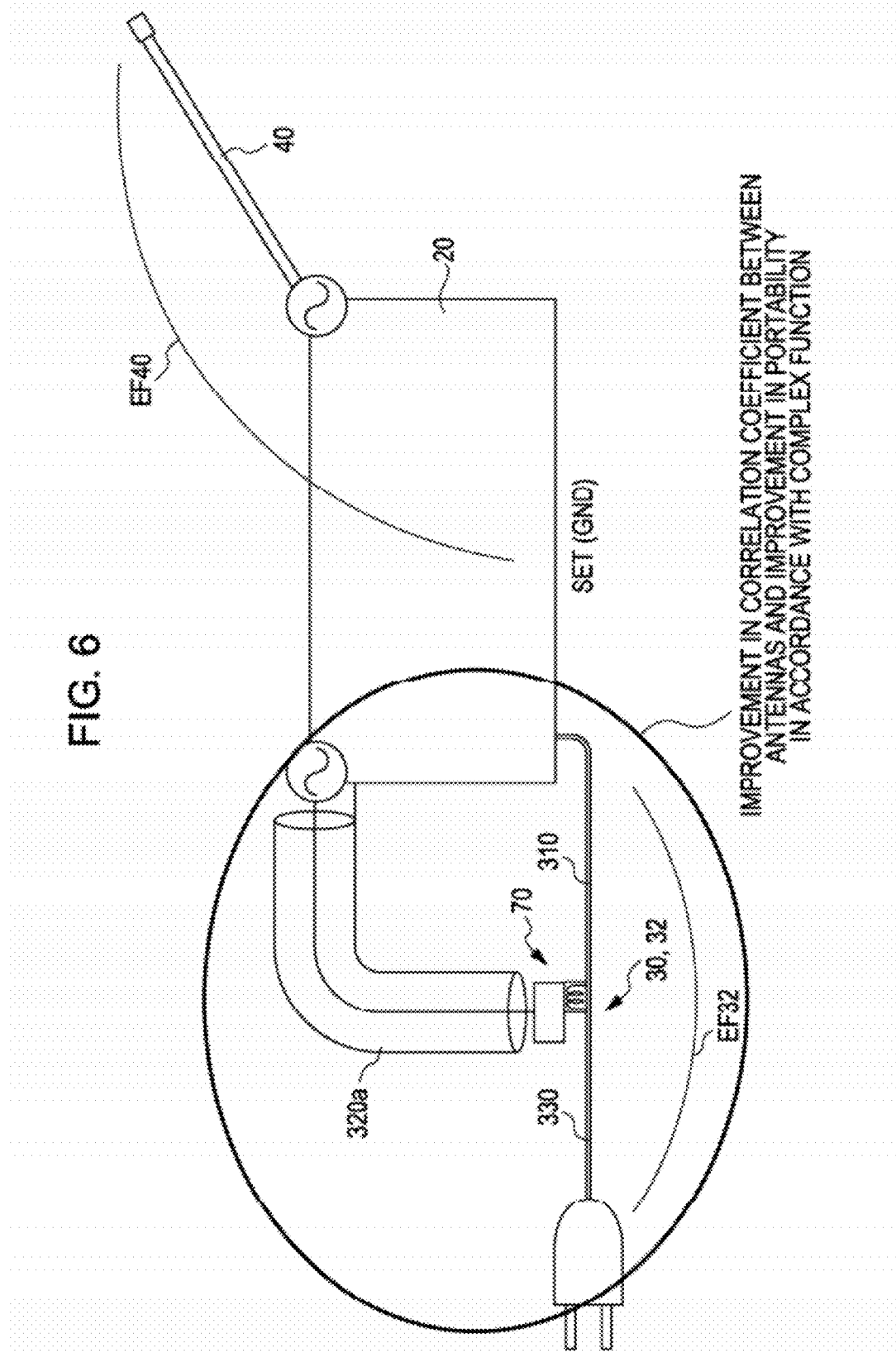
FIG. 6 is a diagram illustrating a first example of interference and portability of two antennas of the receiving apparatus according to the first embodiment.

FIG. 6 is a diagram illustrating a first example of the interference and portability of two antennas of the receiving apparatus according to the first embodiment.

In this example, even when the size of the set ground GND is smaller than the wavelength, an electric field EF40 generated by the first antenna 40 and an electric field EF32 generated by the second antenna 32 do not interfere with each other in the set ground GND. Accordingly, the correlation efficient does not deteriorate.

The second antenna 32 is not larger than that of the example of FIG. 5. The connecting cable including the power cord CPW does not increase and the portability is not lost.

That is, the receiving apparatus 10 according to the first embodiment is improved in the correlation efficient between the antennas and the portability by a complex function.

Figure 7:
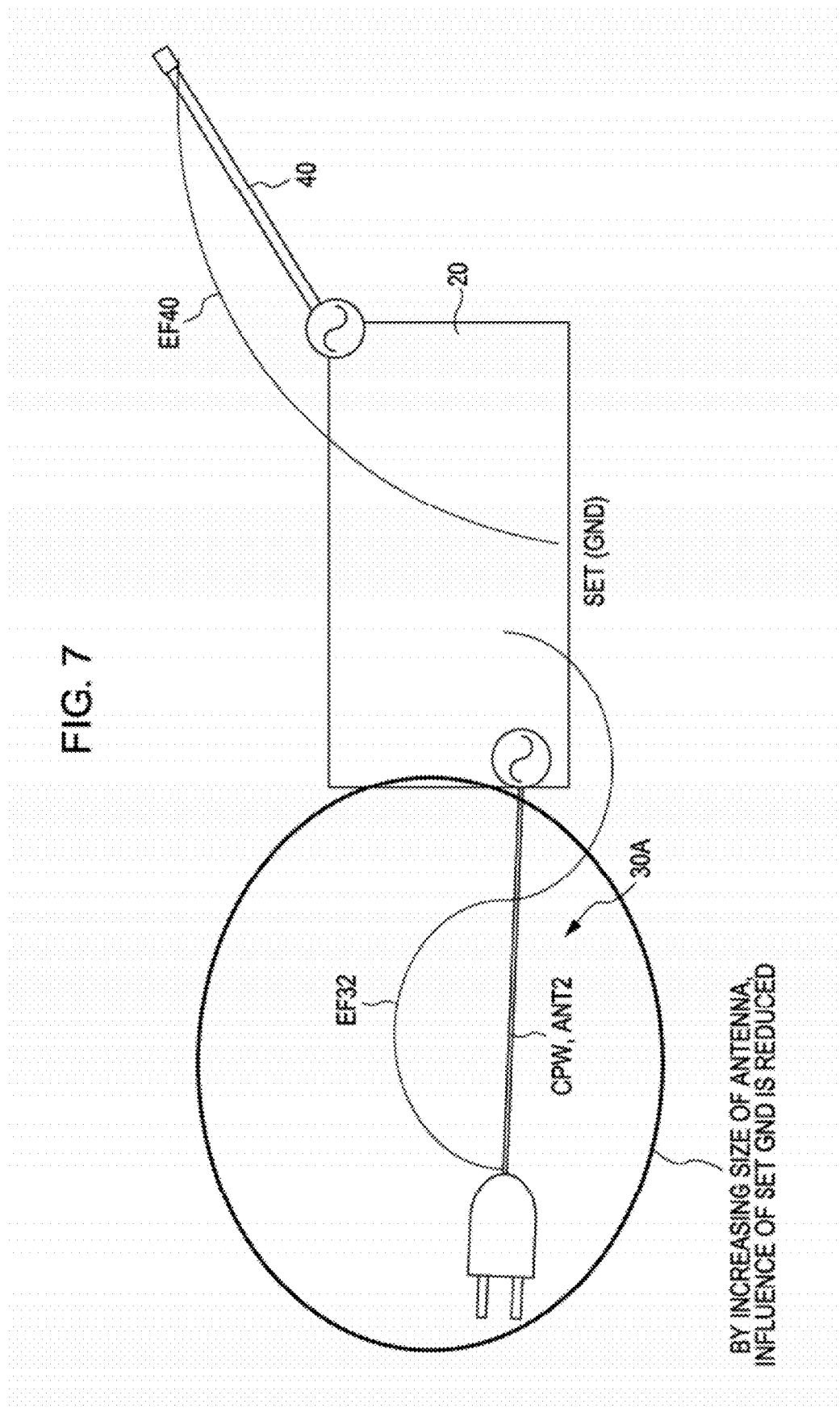
FIG. 7 is a diagram illustrating a second example of interference and portability of two antennas of the receiving apparatus according to the first embodiment.

FIG. 7 is a diagram illustrating a second example of interference and portability of two antennas of the receiving apparatus according to the first embodiment.

In the receiving apparatus 10 in FIG. 7, as described with reference to FIG. 3, the influence of the set ground GND may be reduced by setting the length of the power transmission cable 30A and increasing the size of the second antenna 32A.

Exemplary Configuration of First Antenna

Next, an exemplary configuration of the second antenna of the power transmission cable and the first antenna forming diversity will be described with reference to FIGS. 8 to 12.

Figure 8:
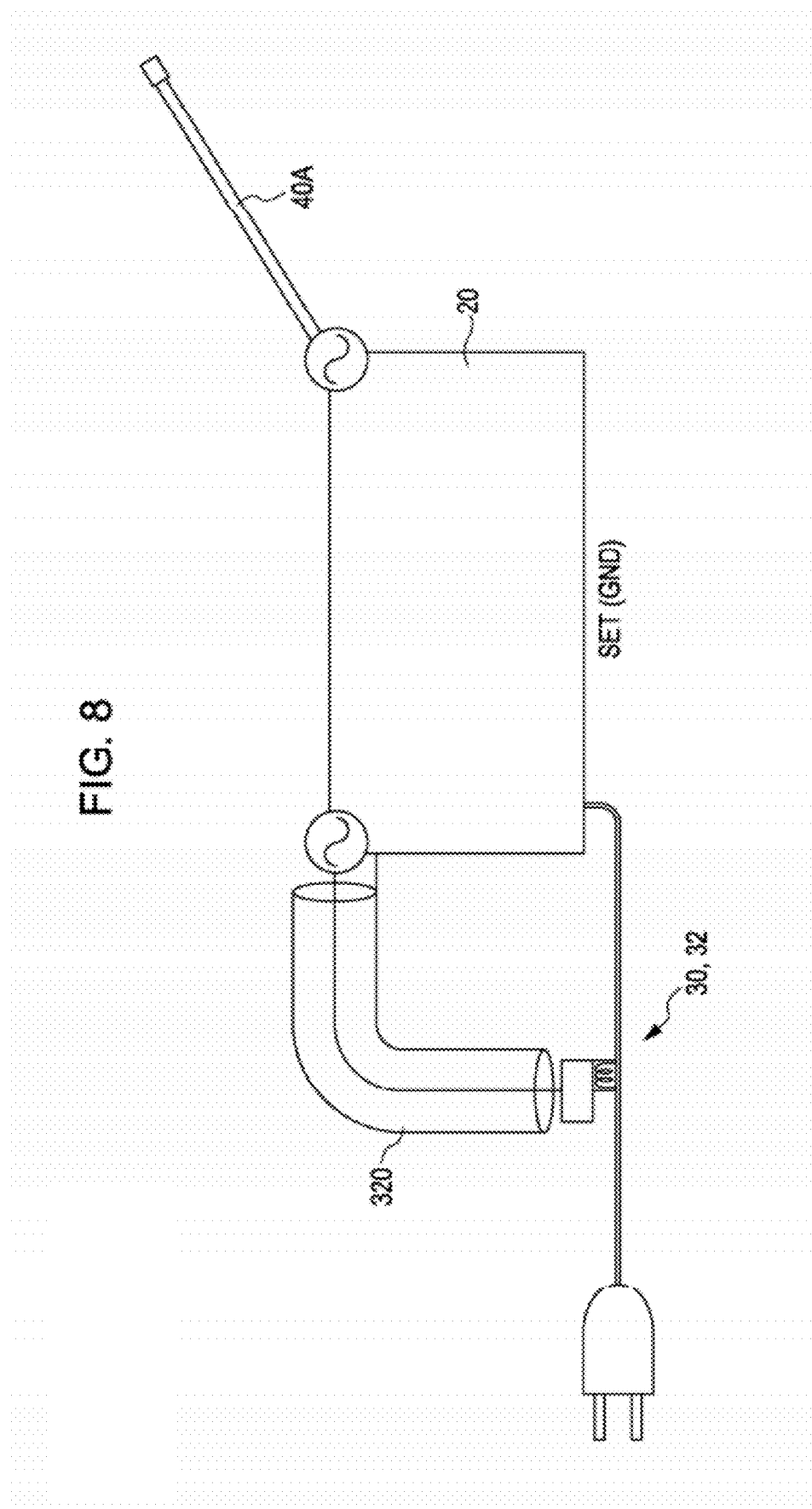
FIG. 8 is a diagram illustrating a first exemplary configuration of a first antenna forming the diversity along with the second antenna of the power transmission cable according to the first embodiment.

FIG. 8 is a diagram illustrating a first exemplary configuration of the first antenna forming the diversity along with the second antenna of the power transmission cable according to the first embodiment.

In the exemplary configuration of FIG. 8, the diversity is achieved by the second antenna 32 and a monopole first antenna 40A of the power transmission cable.

Since the first antenna 40A, which is an antenna fixed to the electronic device 20 serving as a receiver, is excellent in portability, this antenna is suitable for the time of general diversity.

The first antenna 40A is combined with an antenna using the ground plane of the electronic device 20 serving as the receiver.

Figure 9:
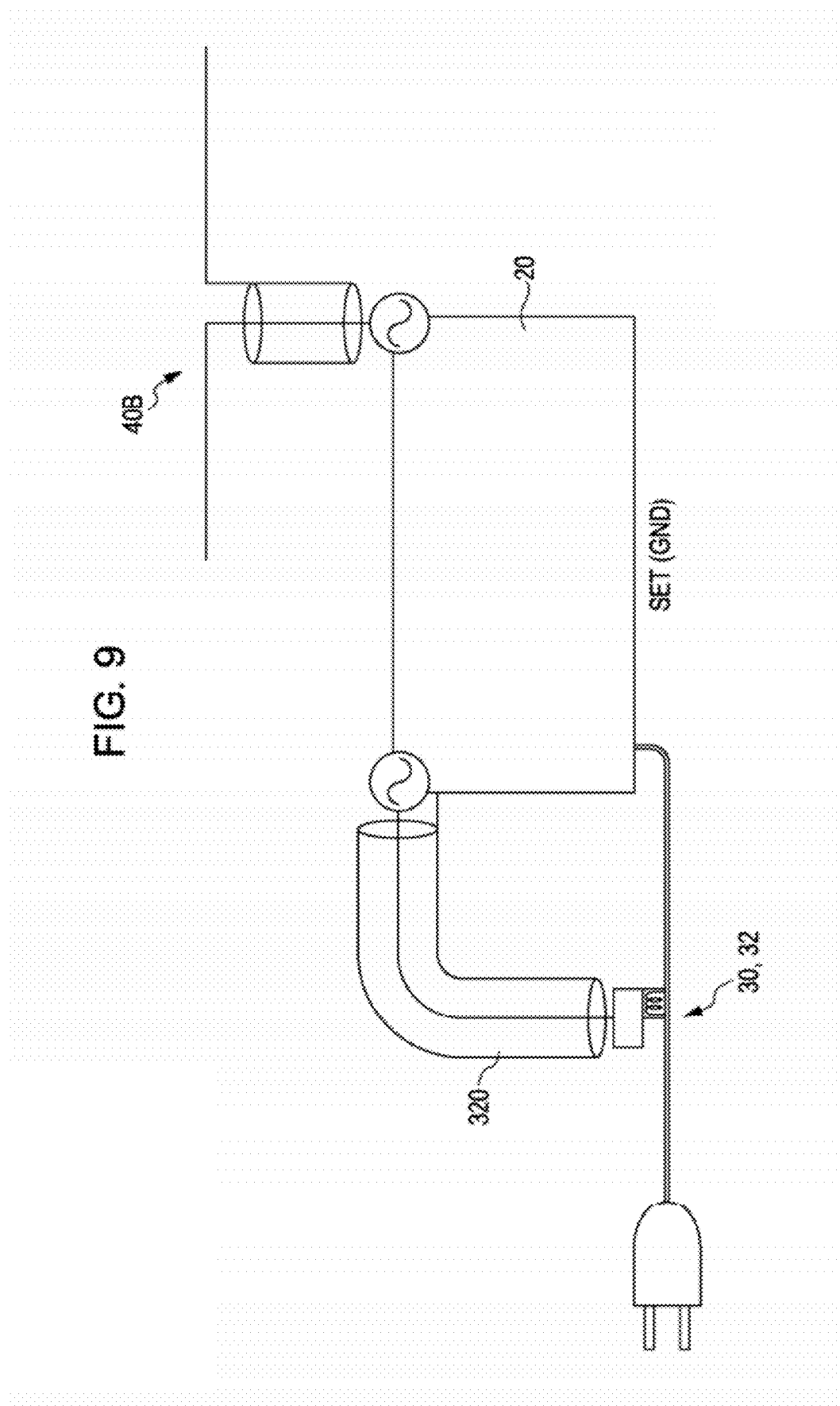
FIG. 9 is a diagram illustrating a second exemplary configuration of the first antenna forming the diversity along with the second antenna of the power transmission cable according to the first embodiment.

FIG. 9 is a diagram illustrating a second exemplary configuration of the first antenna forming the diversity along with the second antenna of the power transmission cable according to the first embodiment.

In the exemplary configuration of FIG. 9, the diversity is achieved by the second antenna and a dipole first antenna 40B of the power transmission cable.

In this case, a high non-correlated relationship may be maintained without using the ground plane of the electronic device 20 serving as the receiver.

The antennas are generally connected to a cable or the like. Therefore, by switching the main polarized waves of two antennas, the configuration of a high diversity effect is achieved.

Figure 10:
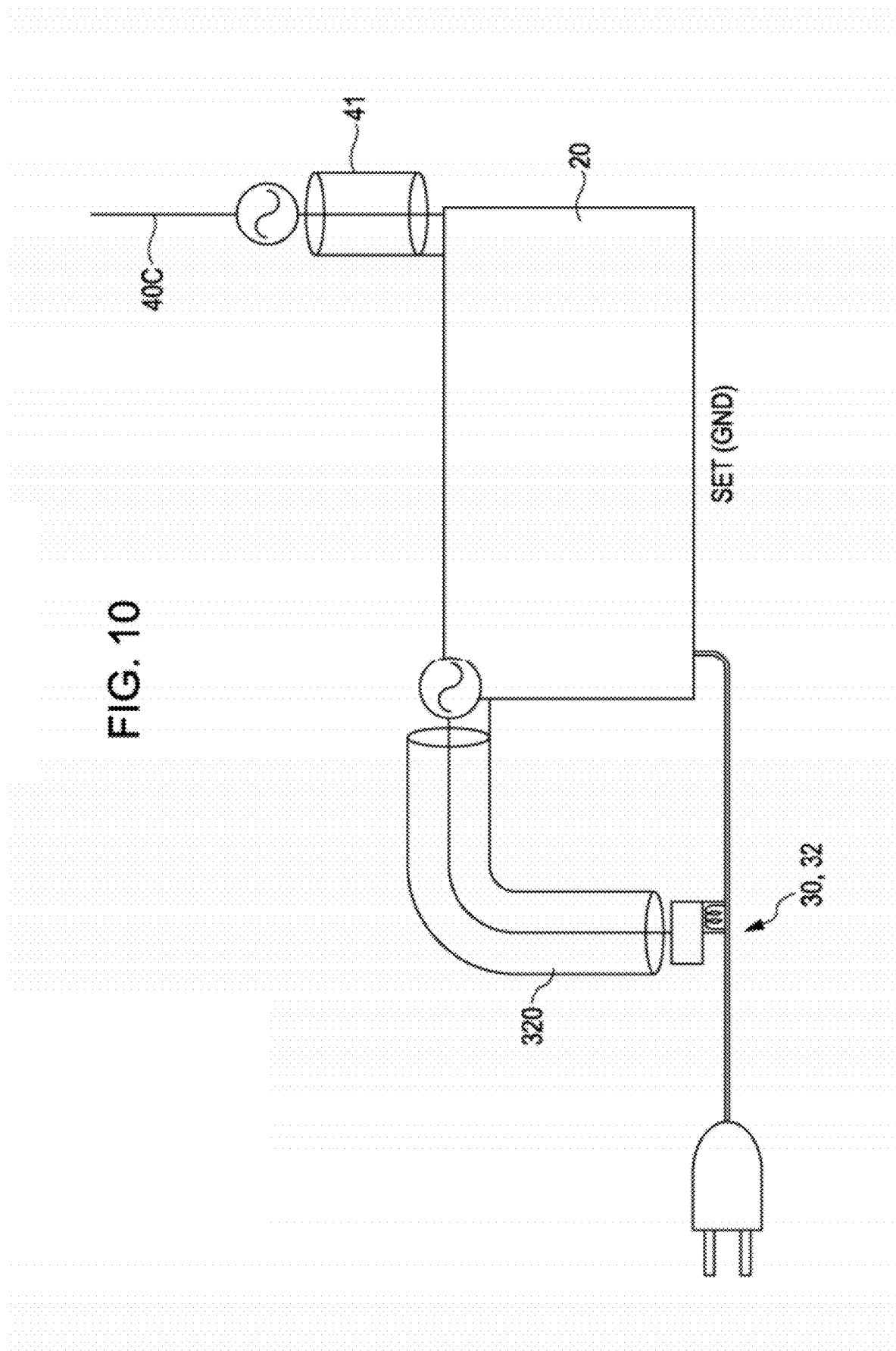
FIG. 10 is a diagram illustrating a third exemplary configuration of the first antenna forming the diversity along with the second antenna of the power transmission cable according to the first embodiment.

FIG. 10 is a diagram illustrating a third exemplary configuration of the first antenna forming the diversity along with the second antenna of the power transmission cable according to the first embodiment.

In the exemplary configuration of FIG. 10, the diversity is achieved by the second antenna of the power transmission cable and a monopole first antenna 40C as an outside antenna.

In this case, a high non-correlated relationship may be maintained by separating the antenna from the electronic device 20 serving as the receiver by the coaxial cable 41.

Figure 11:
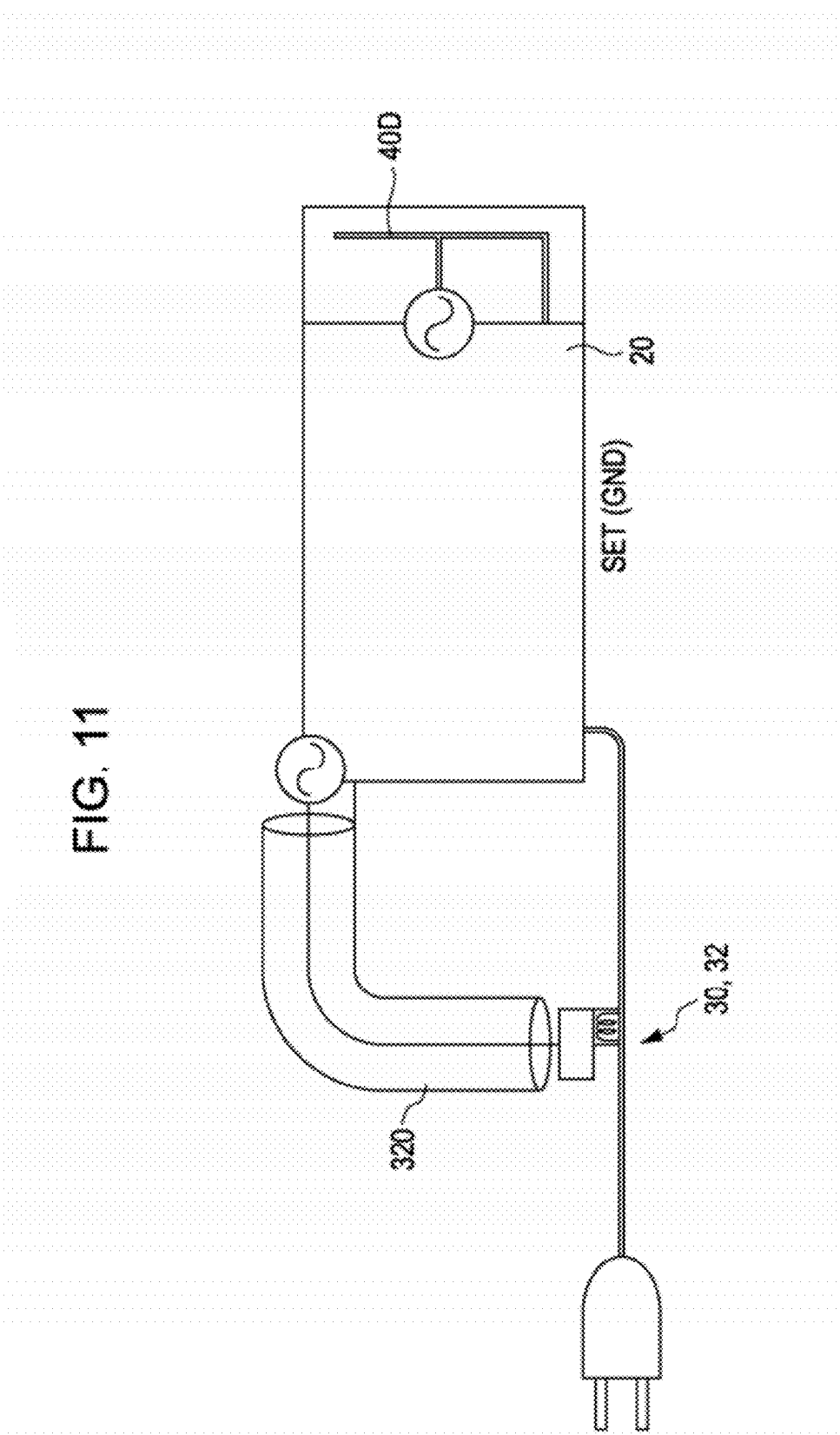
FIG. 11 is a diagram illustrating a fourth exemplary configuration of the first antenna forming the diversity along with the second antenna of the power transmission cable according to the first embodiment.

FIG. 11 is a diagram illustrating a fourth exemplary configuration of the first antenna forming the diversity along with the second antenna of the power transmission cable according to the first embodiment.

In the exemplary configuration of FIG. 11, the diversity is achieved by the second antenna and an inner first antenna 40D of the power transmission cable.

Since the first antenna 40D, which is an inside antenna disposed in the electronic device 20 serving as the receiver, is excellent in portability and design, this antenna is suitable for the time of general diversity.

The first antenna 40D is combined with an antenna using the ground plane of the electronic device 20 serving as the receiver.

Figure 12:
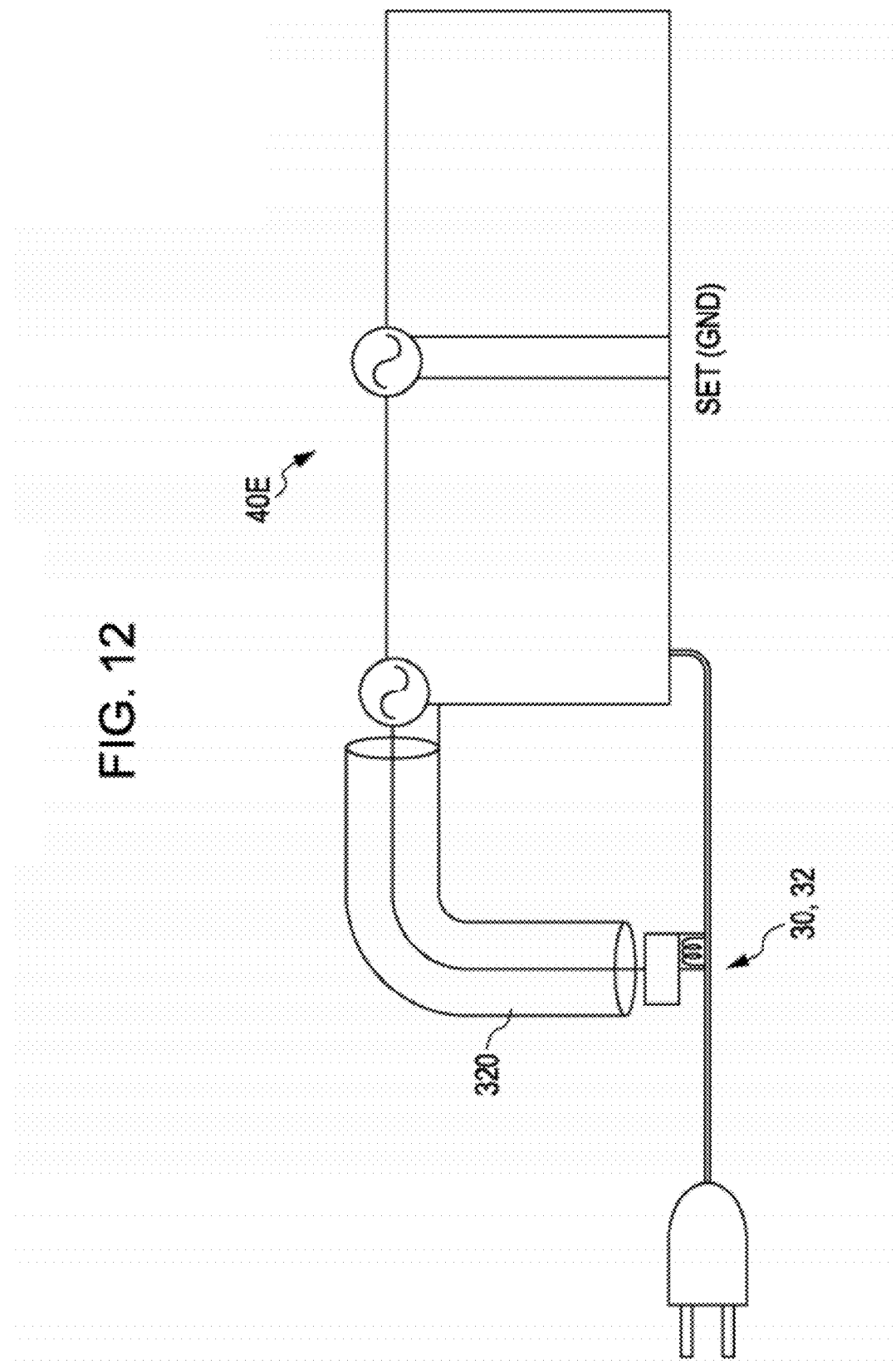
FIG. 12 is a diagram illustrating a fifth exemplary configuration of the first antenna forming the diversity along with the second antenna of the power transmission cable according to the first embodiment.

FIG. 12 is a diagram illustrating a fifth exemplary configuration of the first antenna forming the diversity along with the second antenna of the power transmission cable according to the first embodiment.

In the exemplary configuration of FIG. 12, the diversity is achieved by the second antenna and a substrate dipole type inner first antenna 40E of the power transmission cable.

Since the first antenna 40E, which uses the ground plane of the electronic device 20 serving as the receiver as a dipole, is excellent in portability and design, this antenna is suitable for the time of general diversity.

Exemplary Configuration of Power Transmission Cable

Next, an exemplary configuration of the power transmission cable 30 having the function of the second antenna when the first divergence cable and the power source side cable of the power transmission cable are formed by a shield-attached coaxial cable will be described.

Figure 13:
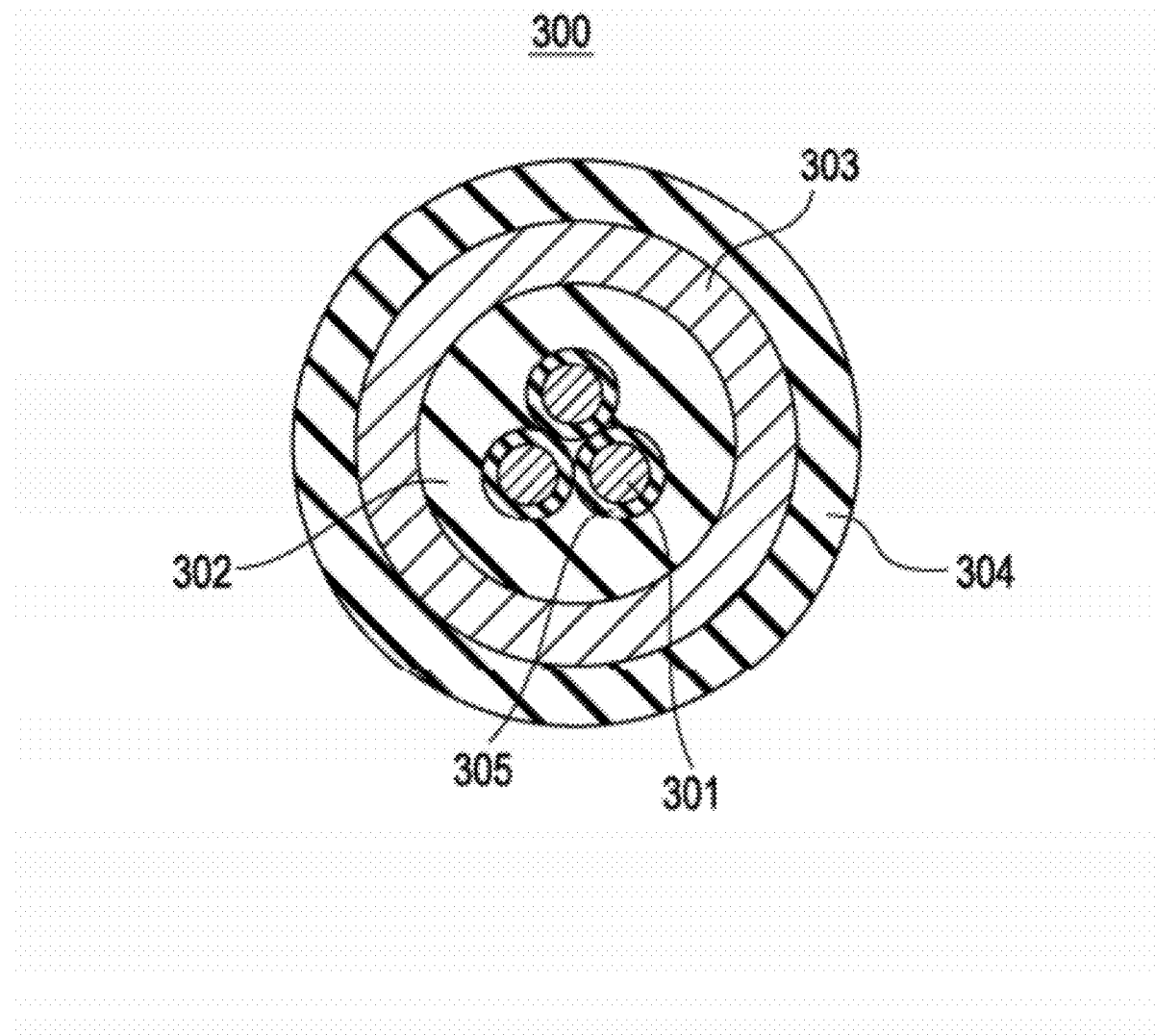
FIG. 13 is a diagram illustrating an exemplary configuration of the shield-attached coaxial cable.

FIG. 13 is a diagram illustrating an exemplary configuration of the shield-attached coaxial cable.

A coaxial cable 300 has plural core lines 301 forming two parallel lines 311(331) and 312(332) and an inner insulating member 302 insulating the core lines 301.

The coaxial cable 300 has a shield portion 303 formed in the outer circumference of the insulating member 302 and an outer insulating member (an outer surface or a jacket) 304 such as an elastomer covering the entire outer circumference.

The outer circumference of the core line 301 is covered with and insulated by a flame resistant insulating member 305.

The shield portion 303 is formed soft copper wires, for example.

The shield portion 303 is formed by a plurality of conductive wires, for example, a braided shield formed by braiding soft copper wires.

The braided shield is known as an electrostatic shield with a small gap in the shield at the bending time, appropriate flexibility, bending strength, and mechanical strength, compared to a served shield.

The core lines 301 and the shield portion 303 have impedance at high frequency.

Figure 14:
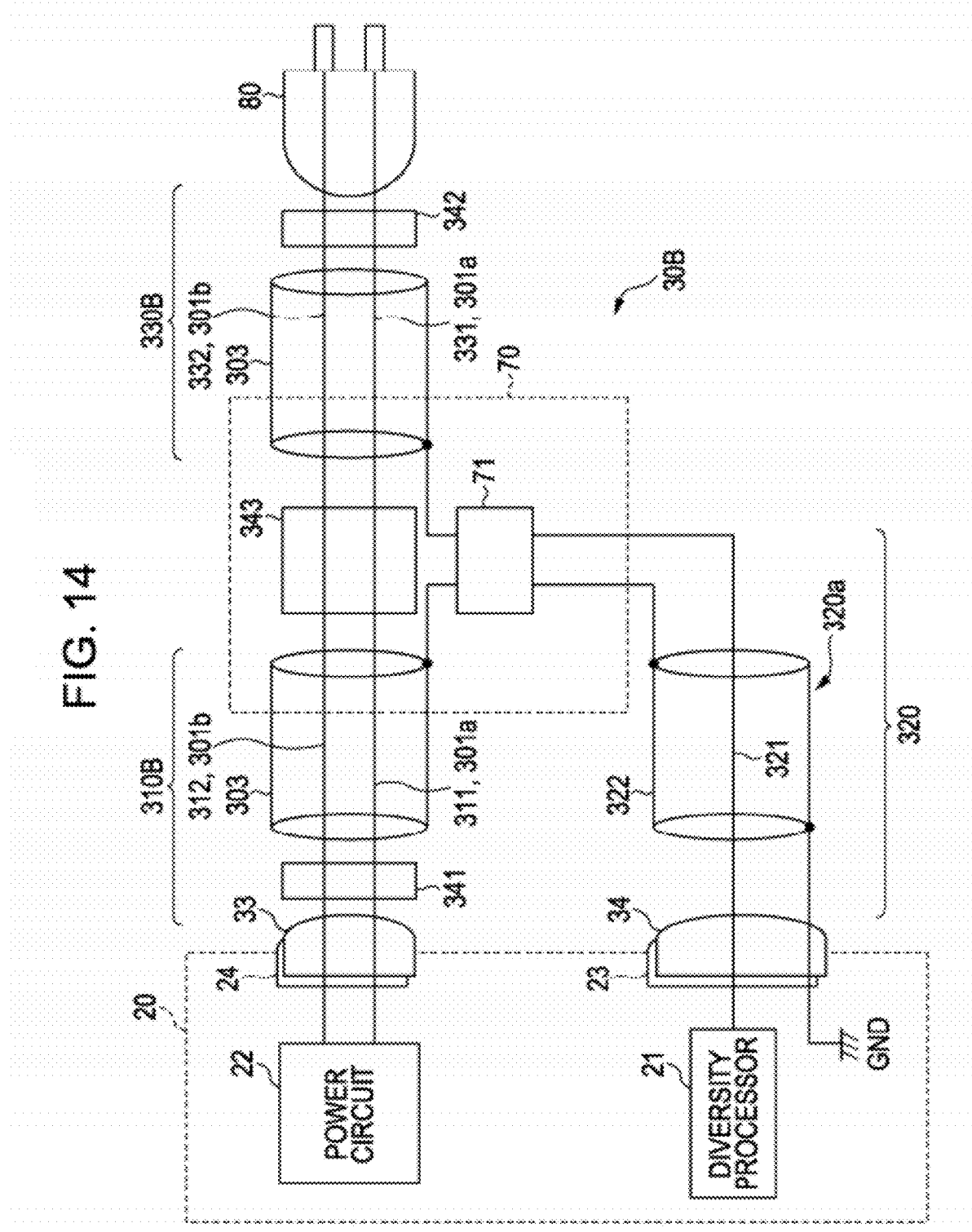
FIG. 14 is a diagram illustrating a first exemplary configuration of the power transmission cable having the function of the second antenna when the first divergence cable and the power source side cable of the power transmission cable are formed by the shield-attached coaxial cable.

First Exemplary Configuration of Power Transmission Cable Formed by Shield-Attached Coaxial Cable FIG. 14 is a diagram illustrating a first exemplary configuration of the power transmission cable having the function of the second antenna when the first divergence cable and the power source side cable of the power transmission cable are formed by the shield-attached coaxial cable.

Here, a first divergence cable 310B and a power source side cable 330B of a power transmission cable 30B are formed by a so-called multi-core coaxial cable 300, as shown with reference to the schematic cross-section of FIG. 13.

The first divergence cable 310B and the power source side cable 330B are manufactured by covering two core lines 311(301a) and 312(301b) and two core lines 331(301a) and 332(301b) with the shield portion 303.

In the first divergence cable 310B and the power source side cable 330B, the two core lines 311(301a) and 312(301b) and the two core lines 331(301a) and 332(301b) may be allocated so as to transmit commercial power and are connected to the power jack 33 and the plug 80.

The first divergence cable 310B and the power source side cable 330B have portions, which are not partially covered with the shield portion 303, in the end close to the power jack 33 and in the end close to the plug 80.

In the first divergence cable 310B and the power source side cable 330B, ferrite cores 341 and 342 are respectively disposed in the portions which are not partially covered with the shield portion 303.

In the ferrite cores 341 and 342, inductors are disposed to suppress high-frequency signals of the two core lines 311 (301a) and 312(301b) and the two core lines 331(301a) and 332(301b).

The ferrite cores 341 and 342 have a trunk shape, for example, and are formed by inserting or winding the power transmission cable forming the first divergence cable 310B and the power source side cable 330B.

The relay section 70 is disposed between the ferrite cores 341 and 342.

In the first divergence cable 310B and the power source side cable 330B, a portion which is not partially covered with the shield portion 303 is formed for the relay section 70.

In the power transmission cable forming the first divergence cable 310B and the power source side cable 330B, the shield portion 303 is segmented in the portion from the ferrite core 341 to the relay section 70 and the portion from the ferrite core 342 to the relay section 70.

In the power transmission cable 30B, an element of a dipole antenna receiving broadcast waves is formed by the shield portion 303 from the ferrite core 341 to the relay section 70 and the shield portion 303 from the ferrite core 342 to the relay section 70.

In the power transmission cable forming the first divergence cable 310B and the power source side cable 330B, the end of the shield portion 303 close to the ferrite core 341 and the end of the shield portion 303 close to the ferrite core 342 are open ends which are not connected to any portion.

In the first divergence cable 310B and the power source side cable 330B, the ends of the shield portion 303 closed to the relay section 70 are connected to the high-frequency signal transmission line 320a, which is the second divergence cable for signal transmission, via the balun 71.

Here, the balun 71 is a balanced-to-unbalanced signal transforming balun in which a transformation ratio is 1:1, for example.

As described above, the second divergence cable 320 for signal transmission is a coaxial cable. The high-frequency connector 34 is disposed in the end of the second divergence cable 320.

In the first divergence cable 310B and the power source side cable 330B, the shield portion 303 close to the power jack 33 and the shield portion 303 close to the plug 80 are connected to the shield portion 322 of the second divergence cable 320 for signal transmission and the core line 321 via the balun 71, respectively.

In the connection region of the first divergence cable 310B and the power source side cable 330B in the relay section 70, a ferrite core 343 is disposed in the same way as that of the ferrite cores 341 and 342.

In the ferrite core 343, an inductor is disposed to suppress the high-frequency of the two core lines 311(301a) and 312 (301b) and the two core lines 331(301a) and 332(301b).

In the first divergence cable 310B and the power source side cable 330B, the core lines 311(301a) and 312(301b) and the two core lines 331(301a) and 332(301b) are separated at high frequency by the ferrite core 343.

Figure 15:
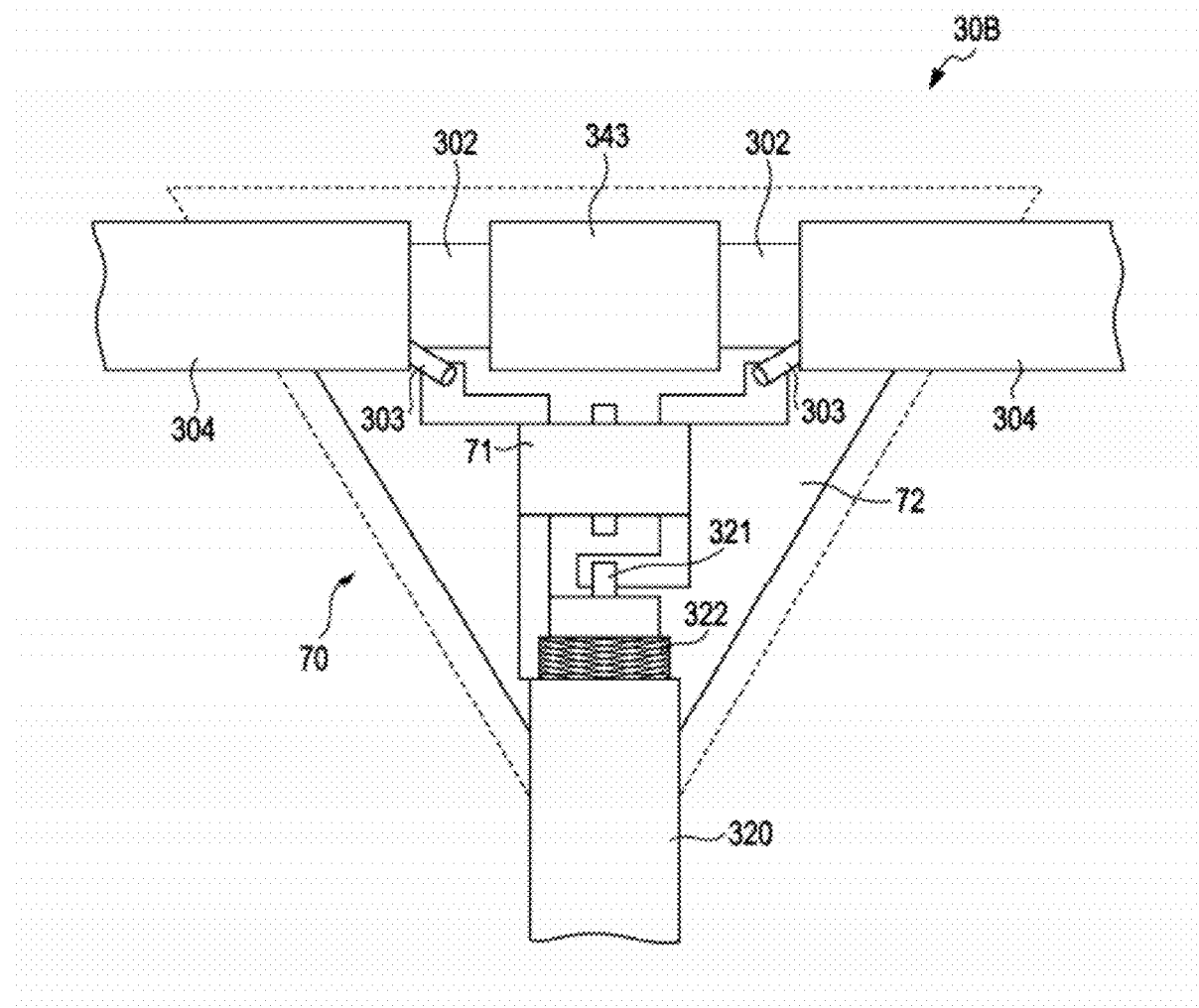
FIG. 15 is a diagram illustrating an exemplary configuration of a relay section (divergence section) according to the embodiment.

FIG. 15 is a diagram illustrating an exemplary configuration of the relay section (divergence section) according to the embodiment.

In the relay section 70 in FIG. 15, the balun 71 is disposed in a wiring board 72. On the wiring board 72, the shield portion 303 of the first divergence cable 310 (close to the power jack 33) and the shield portion 303 of the power source side cable 330 (close to the plug 80) are connected to the balun 71.

On the wiring board 72, the second divergence cable 320 for signal transmission is connected to the balun 71. Subsequently, the entire relay section 70 is molded with resin, as indicated by a dashed line.

Figure 16:
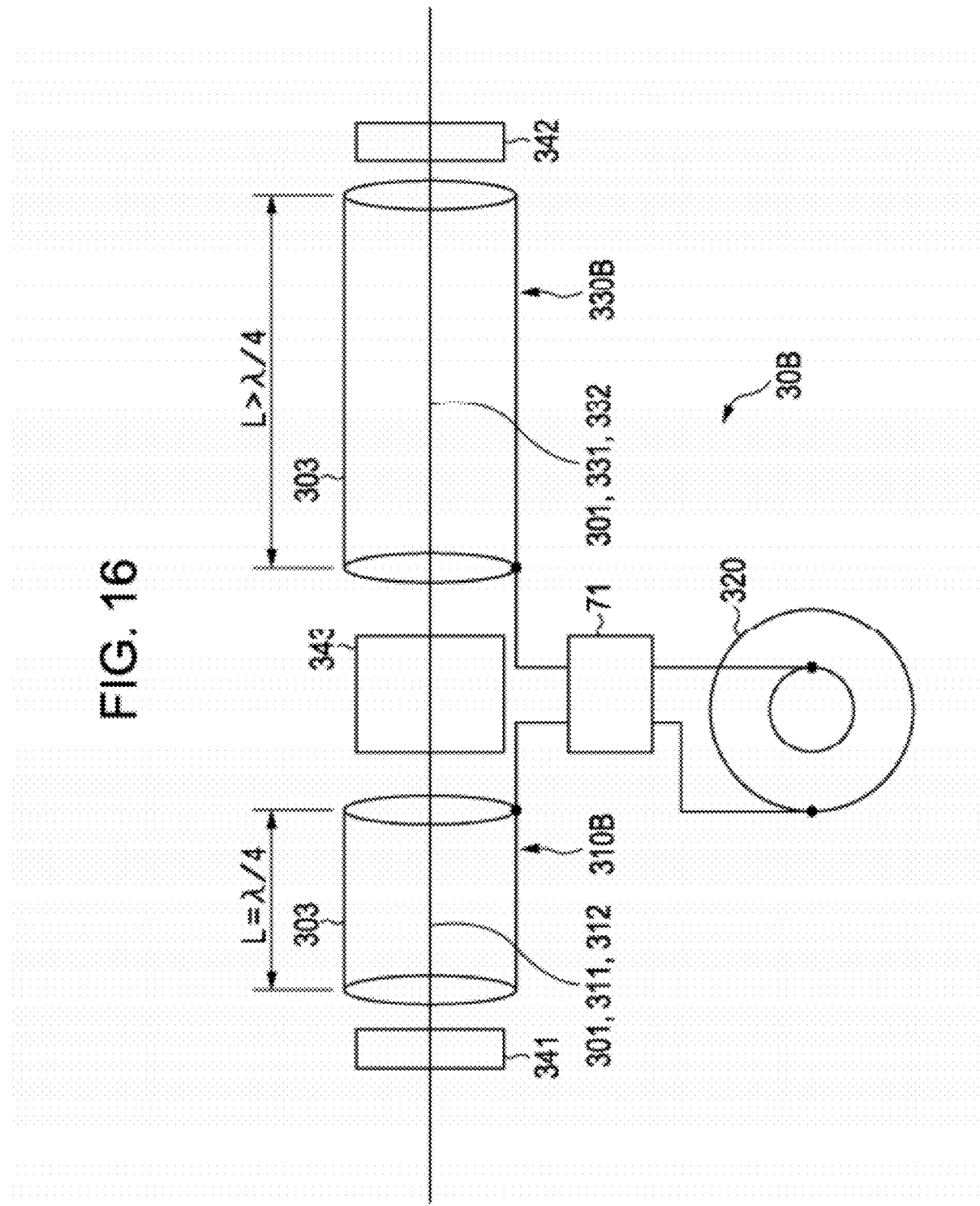
FIG. 16 is a diagram illustrating a representative exemplary configuration of the second antenna formed by the power transmission cable shown in FIG. 14.

FIG. 16 is a diagram illustrating a representative exemplary configuration of the second antenna formed by the power transmission cable in FIG. 14.

In the power transmission cable 30B in FIG. 16, a first divergence cable 310B is configured to have a length of an odd-number multiple of ¼ of the electric field of a desired reception frequency, as in FIG. 3. The length of the first divergence cable 310B in FIG. 16 is set to ¼ wavelength (λ) of the wavelength of the central frequency in the VHF band, for example.

The length of the power source side cable 330B is set to have a length equal to or larger than the length of the first divergence cable 310B.

In this way, in the power transmission cable 30B, the relay section 70 is disposed at the position close to the electronic device 20 with reference to the center of the power transmission cable 30B.

As a consequence, in the power transmission cable 30B, the length of the first divergence cable 310B is set to 150 [mm], for example, and the length of the power source side cable 330B is set to 1000 [mm]. The entire length of the power transmission cable 30B is 1200 [mm].

Here, the operation and advantage of the power transmission cable 30B according to the embodiment shown in FIGS. 14 and 16 will be described.

Here, the function of the second antenna of the power transmission cable 30B will mainly be described in the description of the diversity function.

For example, in the electronic device 20 serving as a television receiver, the power transmission cable 30B is connected to the power plug 24 disposed on the rear surface and the power transmission cable 30B is inserted into the commercial power source socket 50. In this way, the electronic device 20 operates by commercial power supplied via the power transmission cable 30B.

The connector 34 for an antenna is disposed on the rear surface of the electronic device 20 serving as the television receiver. The coaxial cable is connected to the connector 34 for the antenna and thus connected to a so-called outside antenna to receive broadcast waves and a desired channel.

However, when the television receiver is moved to a place such as a kitchen where the household antenna socket is not installed, it is necessary to extend a coaxial cable from a room where the household antenna socket is installed and connect the coaxial cable to the connector 34 for the antenna.

Even when the television receiver is used in a room where a household antenna socket is installed, it is necessary to draw a coaxial cable and connect the coaxial cable.

Therefore, even though the main body of the television receiver becomes lightweight and miniature and thus the television receiver is improved in terms of portability, the portability is lost in terms of the antenna.

The power cable may be considered for use as an antenna, as in related art. In this case, however, a problem may arise in that sufficient gain may not be ensured in a sufficiently broad frequency band.

That is, when the configuration disclosed in Japanese Unexamined Patent Application Publication No. 2002-151932 or Japanese Patent No. 4105078 is applied and broadcast waves are received in the VHF band, it is necessary to set the length of the antenna cable to 1 [mm] or more.

In this case, however, a null point occurs in the antenna gain in the range from 470 to 770 [MHz] of the UHF band.

On the contrary, when the length of the antenna cable is set to a length suitable for the UHF band, the antenna gain is lacking in the VHF band. Therefore, sufficient gain may not be ensured in the sufficient broad frequency band.

When the configuration disclosed in Japanese Unexamined Patent Application No. 2005-341067 is used, a power cable on the side of an LC resonant circuit and a power cable on the side of no LC resonant circuit are combined with each other at high frequency, and thus the function of the LC resonant circuit may not be sufficiently exerted.

Moreover, in the LC resonant circuit, the function may not be exerted when the frequency is distant from the resonant frequency. Even in this case, sufficient gain may not be ensured in the sufficient broad frequency band.

In the first embodiment, the broadcast waves may also be received through the power transmission cable 30B by configuring the power transmission cable 30B so as to function as a dipole antenna.

That is, in the power transmission cable 30B, the two core lines 311(301a) and 312(301b) and the two core lines 331(301a) and 332(301b) of the first divergence cable 310B and the power source side cable 330B may be allocated so as to transmit commercial power.

The shield portion 303 covering the core lines 311(301a) and 312(301b) and the core lines 331(301a) and 332(301b) is separated into the portion close to the electronic device 20 and the portion close to the plug 80 by the relay section 70. In addition, the element of the dipole antenna is formed by the shield portion 303.

Each element is connected to the diversity processor (tuner) 21 of the electronic device 20 serving as the television receiver via the second divergence cable 320 for signal transmission.

As a consequence, in the first embodiment, the broadcast waves may be received by configuring the power transmission cable 30B so as to function as the dipole antenna. Accordingly, the broadcast waves may be received with sufficient gain at a broad frequency band, compared to a case according to related art.

In the power transmission cable 30B, the ferrite cores 341 and 342 are disposed in the end of the shield portion 303 close to the electronic device 20 serving as the television receiver and the end close to the plug 80, respectively.

The ferrite cores 341 and 342 restrict the high-frequency electric field of the core lines 311(301a) and 312(301b) and the core lines 331(301a) and 332(301b) connected at high frequency to the shield portion 303.

As a consequence, in the power transmission cable 30B, a variation in the antenna gain of the inside wiring line and the household wiring line of the television receiver may be avoided effectively, thereby receiving the broadcast waves stably.

A noise from the commercial power source may be prevented from being mixed and the influence of the inner noise of the television receiver may be avoided. Accordingly, it is possible to receive the broadcast waves stably.

In the power transmission cable 30B, the ferrite core 343 is disposed in the relay section 70.

The core lines 311(301a) and 312(301b) and the core lines 331(301a) and 332(301b) are separated at the high frequency from the portion close to the electronic device 20 serving as the television receiver and the portion close to the plug 80 by the ferrite core 343.

As a consequence, the power transmission cable 30B may prevent anti-resonance caused due to the harmonics of an even-number multiple and thus the gain may be prevented from deteriorating. Accordingly, compared to related art, the broadcast waves may be received with sufficient gain at a broad frequency band.

By connecting the second divergence cable 320 for signal transmission to the shield portion 303 via the balun 71, the influence of the noise from the television receiver may be avoided. Accordingly, the broadcast waves may be received with sufficient gain at a broad frequency band.

As shown in FIG. 16, the length of the shield portion 303 close to the electronic device 20 serving as the television receiver is set to be different from the length of the shield portion 303 close to the plug 80. Accordingly, the broadcast waves may be received with sufficient gain at a broad frequency band.

FIGS. 17A and 17B are diagrams illustrating the characteristics of a peak gain with respect to the frequency of the receiving apparatus according to a comparative example and the first embodiment, respectively. In FIG. 17A, the characteristics of the peak gain are shown according to the comparative example. In FIG. 17B, the characteristics of the peak gain are shown according to the first embodiment.

In FIGS. 17A and 17B, a curve indicated by H shows the characteristics of horizontal polarization and a curve indicated by V shows the characteristic of vertical polarization.

FIG. 17A is the diagram illustrating the characteristics of an antenna having the configuration disclosed in Japanese Unexamined Patent Application Publication No. 2002-151932.

In a miniature television receiver, the measurement is carried out by using an evaluation board with a supposed ground size of 300×300 [mm] and setting the length of a cable functioning as an antenna to 1 [mm].

FIGS. 17A and 17B illustrate tables showing the measurement results in detail in accordance with the characteristics.

According to the comparative example in FIG. 17A, since the periodic deterioration in the antenna gain occurs, it may be confirmed that the broadcast waves may not be received with a sufficient gain at a broad frequency band.

On the contrary, according to the first embodiment, since the antenna gain of about −5 [dB] is ensured in the entire frequency band, the broadcast waves may be received with sufficient gain at a broad frequency band.

That is, in the first embodiment, deterioration in the antenna gain is reduced and the characteristics throughout the entire band are good, compared to the comparative example.

The condition of the measurement is the same as that of the comparative example.

According to the first embodiment, the element of the dipole antenna is formed using the power transmission cable 30B and connected to the antenna connector of the electronic device 20 serving as the television receiver through the coaxial cable. Accordingly, compared to an antenna according to related art, the portability of the antenna is improved and the broadcast waves may be received with sufficient gain at a broad frequency band.

By disposing the inductors suppressing the high-frequency signals of the core lines in the end of the portions corresponding to the element close to the electronic device 20 serving as the television receiver and the plug 80, it is possible to prevent the deterioration in the characteristics by the core lines.

By forming the inductors by the ferrite cores inserted into the power transmission cable, it is possible to prevent the deterioration in the characteristics due to the core lines with a simple and plain configuration.

By disposing the inductor suppressing the high frequency of the core line in the relay section, it is possible to prevent the deterioration in the characteristics due to the anti-resonance.

By connecting a coated wire to the second divergence cable 320 for signal transmission, which is the coaxial cable, via the balun 71, it is possible to prevent the deterioration in the characteristics due to the electronic device 20 serving as the television receiver.

By setting the length of the portion of the shield portion 303 close to the electronic device 20 serving as the television receiver to be different from the length of the portion of the shield portion 303 close to the plug 80, the broadcast waves may be received with sufficient gain at a broad frequency band.

Second Exemplary Configuration of Power Transmission Cable Formed by Shield-Attached Coaxial Cable FIG. 18 is a diagram illustrating a second exemplary configuration of the power transmission cable having the function of the second antenna when the first divergence cable and the power source side cable of the power transmission cable are formed by the shield-attached coaxial cable.

A difference between a power transmission cable 30C in FIG. 18 and the power transmission cable 30B in FIG. 14 is that an amplifying circuit 73 is installed in the relay section 70C and the amplifying circuit 73 amplifies and outputs a high-frequency signal caused by the shield portion 303.

The amplifying circuit 73 supplies power via the second divergence cable 320 for signal transmission, for example. Accordingly, an appropriate constituent element, such as a capacitor, used to transmit power is disposed in the second divergence cable 320 for signal transmission.

The other configuration of the power transmission cable 30C in FIG. 18 is the same as that of the power transmission cable 30B in FIG. 14.

In the power transmission cable 30C in FIG. 18, the amplifying circuit 73 is disposed in the relay section 70C and the amplifying circuit 73 amplifies and outputs the high-frequency signal caused by the shield portion 303. Accordingly, it is possible to further improve the antenna gain.

Third Exemplary Configuration of Power Transmission Cable Formed by Shield-Attached Coaxial Cable FIG. 19 is a diagram illustrating a third exemplary configuration of the power transmission cable having the function of the second antenna when the first divergence cable and the power source side cable of the power transmission cable are formed by the shield-attached coaxial cable.

A difference between a power transmission cable 30D in FIG. 19 and the power transmission cable 30B in FIG. 14 is that only the shield portion 303 of the first divergence cable 310B close to the electronic device 20 is connected to the second divergence cable 320 for signal transmission via the balun 71.

The other configuration of the power transmission cable 30D is the same as that of the power transmission cable 30B in FIG. 14.

Instead of the shield portion 303 of the first divergence cable 310B close to the electronic device 20, only the shield portion 303 of the power source side cable 330B close to the plug 80 may be connected to the balun 71.

In the power transmission cable 30D in FIG. 19, it is possible to obtain the same advantage as that of the power transmission cable 30B in FIG. 14.

Fourth Exemplary Configuration of Power Transmission Cable Formed by Shield-Attached Coaxial Cable FIG. 20 is a diagram illustrating a fourth exemplary configuration of the power transmission cable having the function of the second antenna when the first divergence cable and the power source side cable of the power transmission cable are formed by the shield-attached coaxial cable.

A difference between a power transmission cable 30E in FIG. 20 and the power transmission cable 30B in FIG. 14 is that the shield portion 303 is directly connected to the second divergence cable 320 for signal transmission without the balun 71.

The other configuration of the power transmission cable 30E is the same as that of the power transmission cable 30B in FIG. 14.

In the power transmission cable 30E in FIG. 20, since the configuration is simplified, it is possible to obtain the same advantage as that of the power transmission cable 30B in FIG. 14.

Fifth Exemplary Configuration of Power Transmission Cable Formed by Shield-Attached Coaxial Cable FIG. 21 is a diagram illustrating a fifth exemplary configuration of the power transmission cable having the function of the second antenna when the first divergence cable and the power source side cable of the power transmission cable are formed by the shield-attached coaxial cable.

A difference between a power transmission cable 30F in FIG. 21 and the power transmission cable 30B in FIG. 14 is that the ferrite cores 341, 342, and 343 are omitted.

The other configuration of the power transmission cable 30F is the same as that of the power transmission cable 30B in FIG. 14.

In the power transmission cable 30F in FIG. 21, since the configuration is simplified, it is possible to obtain the same advantage as that of the power transmission cable 30B in FIG. 14.

Applied Examples of Receiving Apparatus

Next, the applied examples where the receiving apparatus 10 according to the first embodiment is applied to an electronic device other than the television receiver will be described.

FIG. 22 is a diagram illustrating a first applied example of the receiving apparatus according to the first embodiment other than the television receiver.

A receiving apparatus 10A in FIG. 22 corresponds to a first applied example to an in-vehicle PND (Personal Navigation Device) serving as an electronic device 20A.

In this example, a rod antenna 401 is applied as first antenna 40.

A cigarette socket 80A is applied as the power plug.

FIG. 23 is a diagram illustrating a second applied example of the receiving apparatus according to the first embodiment other than the television receiver.

A receiving apparatus 10B in FIG. 23 corresponds to a second applied example to an in-vehicle PND (Personal Navigation Device) serving as an electronic device 20B.

In this example, instead of the rod antenna, a film antenna 402 attached to the front glass of a vehicle, for example, is applied as the first antenna 40.

A cigarette socket 80B is applied as the power plug.

Figure 24:
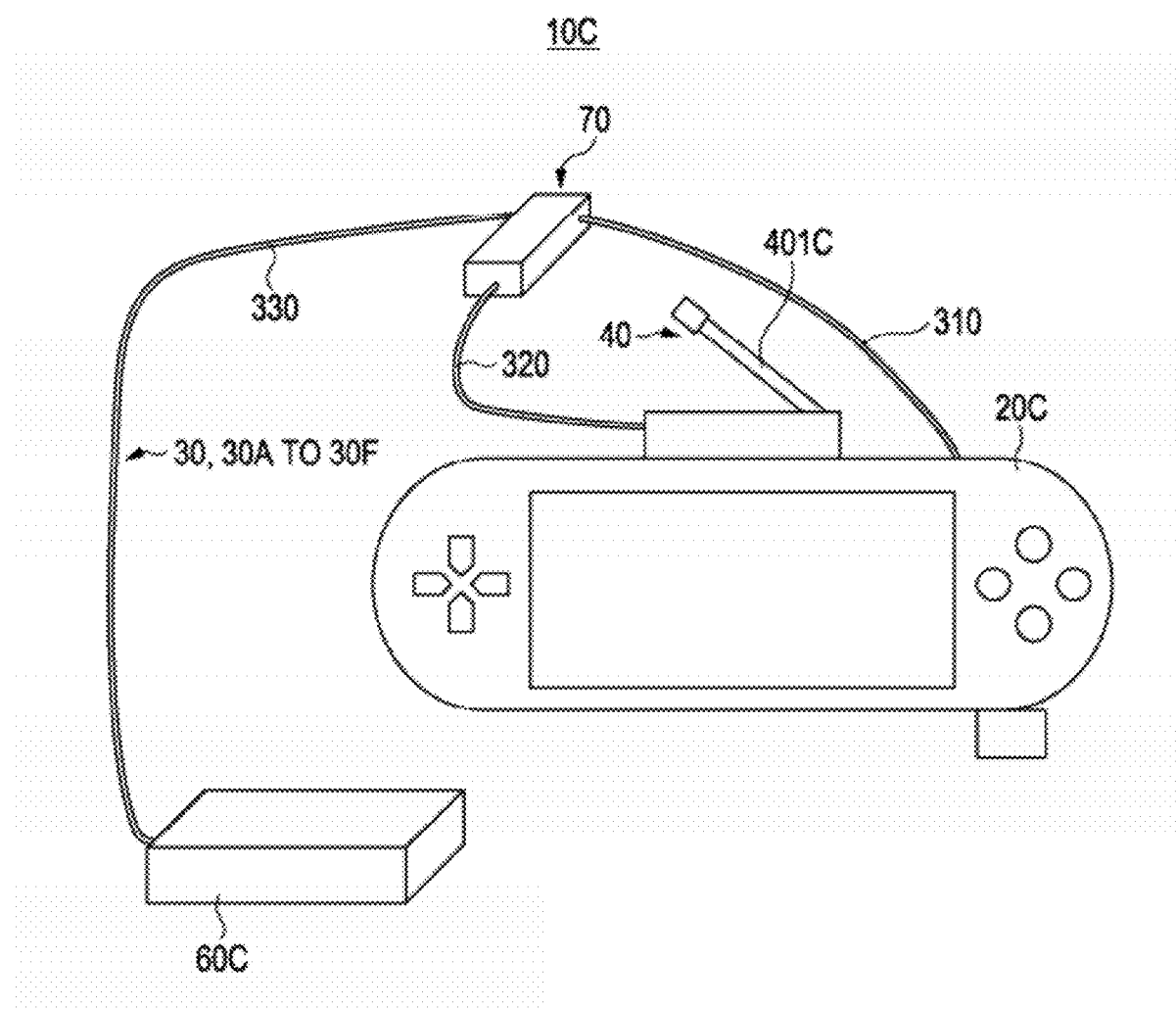
FIG. 24 is a diagram illustrating a third applied example of the receiving apparatus according to the first embodiment other than the television receiver.

FIG. 24 is a diagram illustrating a third applied example of the receiving apparatus according to the first embodiment other than the television receiver.

A receiving apparatus 10C in FIG. 24 corresponds to a first applied example to a mobile game console serving as an electronic device 20C.

In this example, a rod antenna 401C is applied as the first antenna 40.

An AC adapter 60C is applied as the power source.

Figure 25:
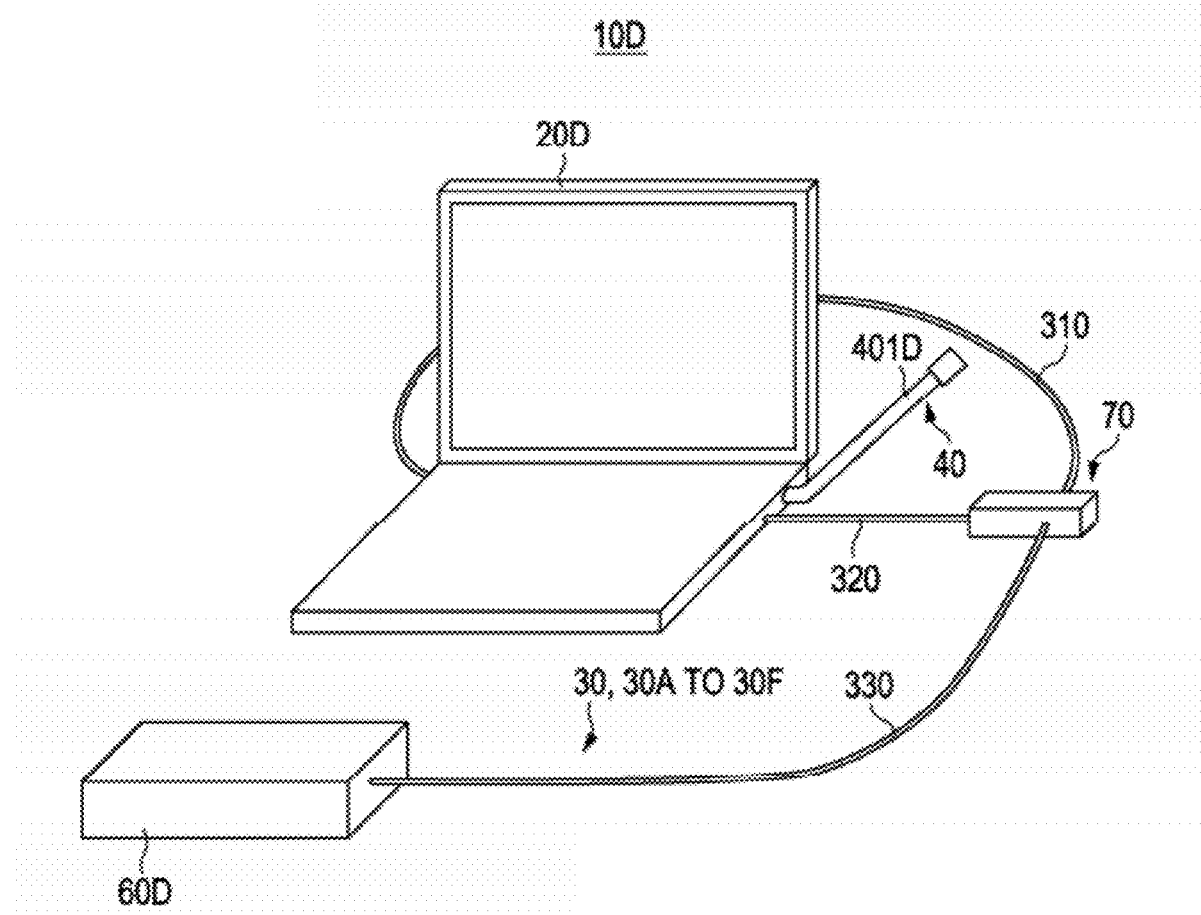
FIG. 25 is a diagram illustrating a fourth applied example of the receiving apparatus according to the first embodiment other than the television receiver.

FIG. 25 is a diagram illustrating a fourth applied example of the receiving apparatus according to the first embodiment other than the television receiver.

A receiving apparatus 10D in FIG. 25 corresponds to an applied first example to a note-type PC serving as an electronic device 20D.

In this example, a rod antenna 401D is applied as the first antenna 40.

An AC adapter 60D is applied as the power source.

Figure 26:
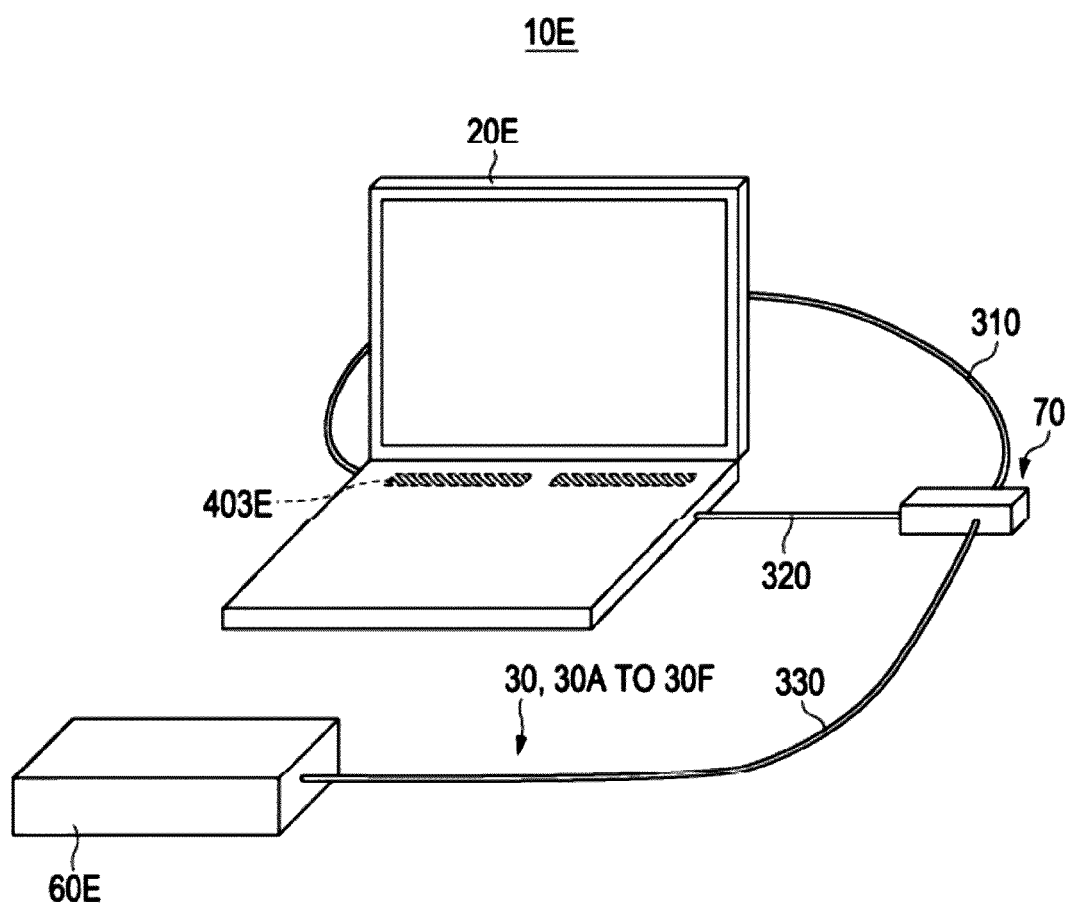
FIG. 26 is a diagram illustrating a fifth applied example of the receiving apparatus according to the first embodiment other than the television receiver.

FIG. 26 is a diagram illustrating a fifth applied example of the receiving apparatus according to the first embodiment other than the television receiver.

A receiving apparatus 10E in FIG. 26 corresponds to a second example applied to a note-type PC serving as an electronic device 20E.

In this example, an inside antenna 403E is applied as the first antenna 40.

An AC adapter 60E is applied as the power source.

Figure 27:
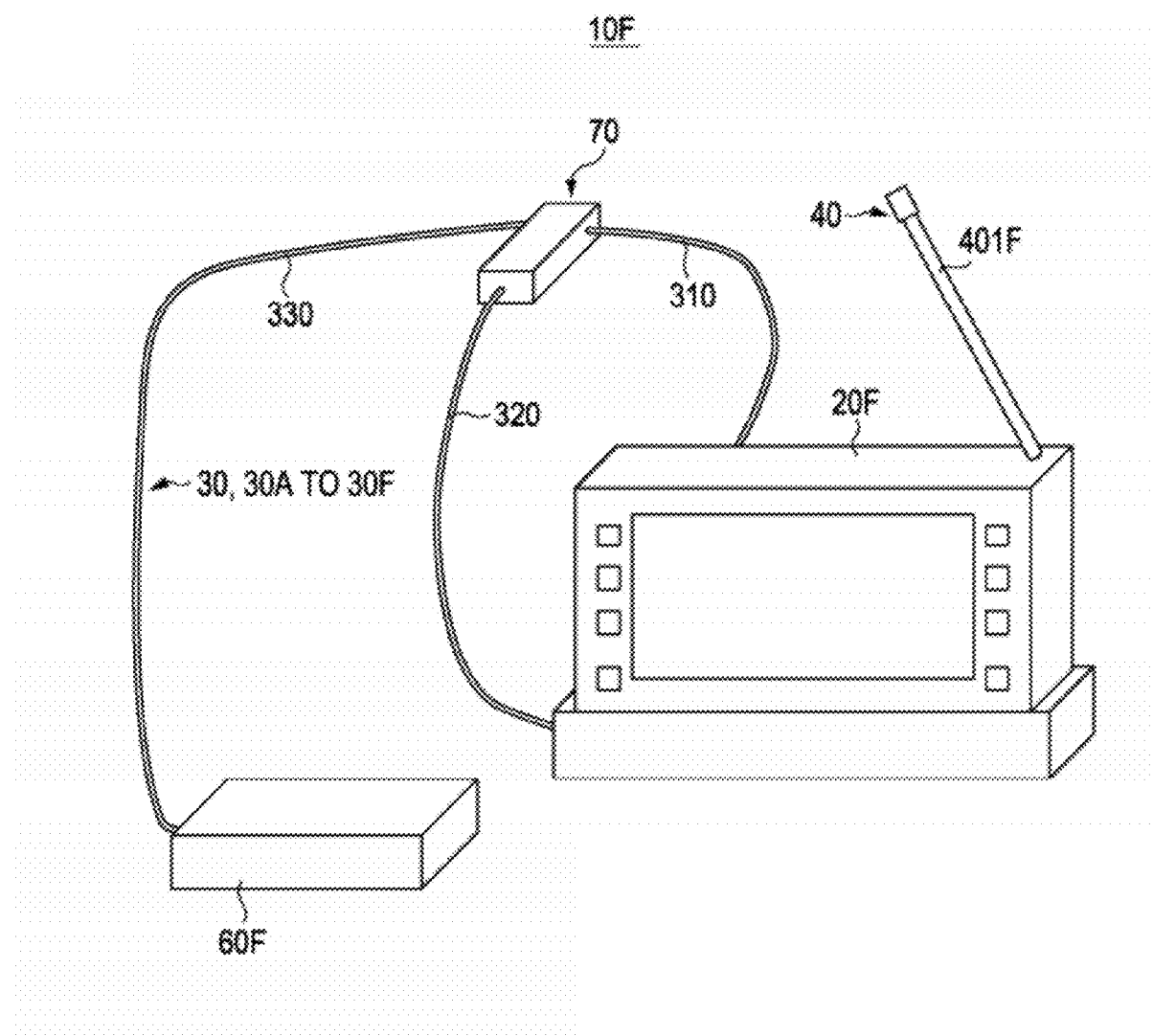
FIG. 27 is a diagram illustrating a sixth applied example of the receiving apparatus according to the first embodiment other than the television receiver.

FIG. 27 is a diagram illustrating a sixth applied example of the receiving apparatus according to the first embodiment other than the television receiver.

A receiving apparatus 10F in FIG. 27 corresponds to an example applied to a portable television (TV) receiver serving as an electronic device 20F.

In this example, a rod antenna 401F is applied as the first antenna 40.

An AC adapter 60F is applied as the power source.

Figure 28:
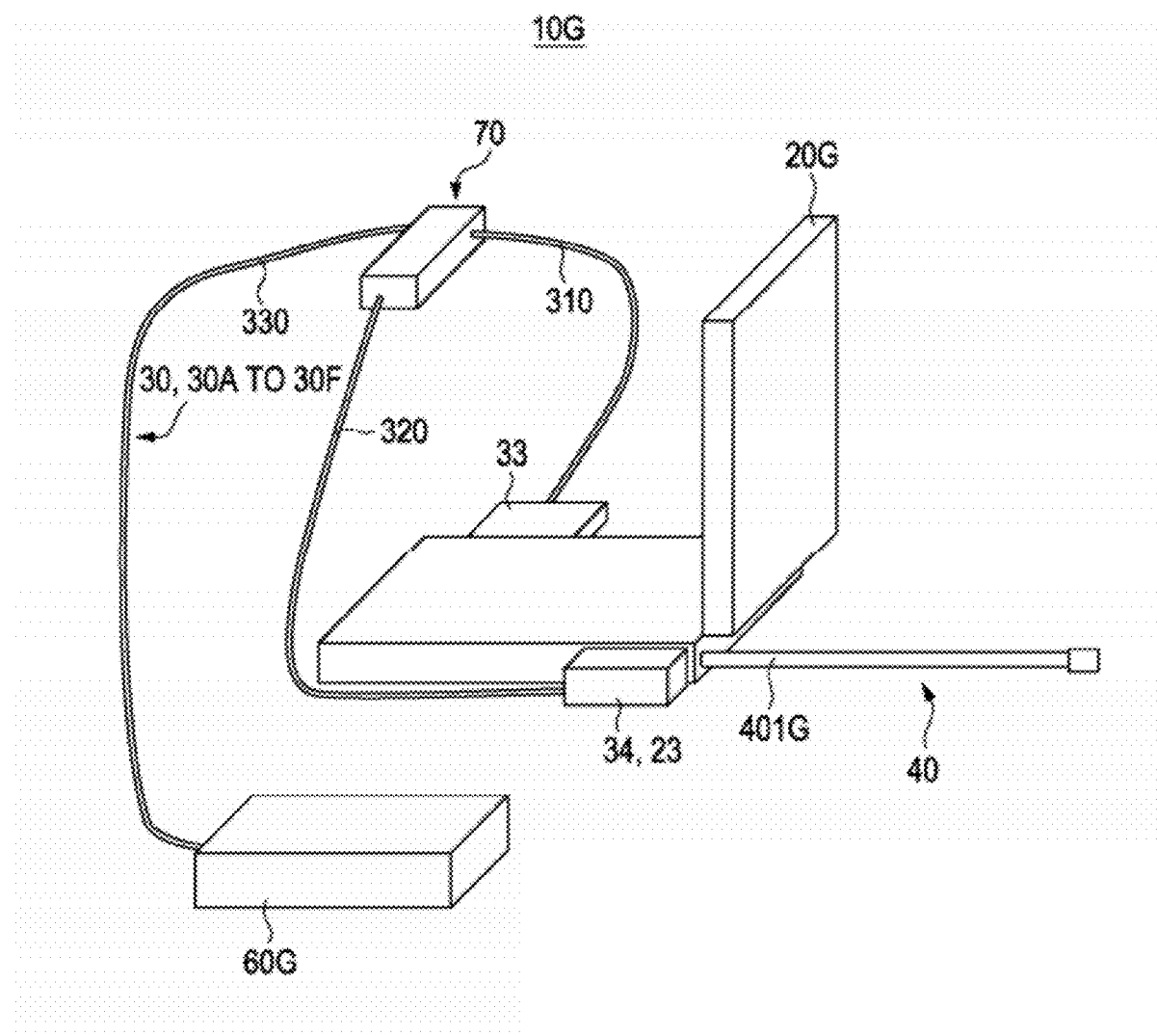
FIG. 28 is a diagram illustrating a seventh applied example of the receiving apparatus according to the first embodiment other than the television receiver.

FIG. 28 is a diagram illustrating a seventh applied example of the receiving apparatus according to the first embodiment other than the television receiver.

A receiving apparatus 10G in FIG. 28 corresponds to a first example applied to a cellular phone serving as an electronic device 20G.

In this example, a rod antenna 401G is applied as the first antenna 40.

An AC adapter 60G is applied as the power source.

Figure 29:
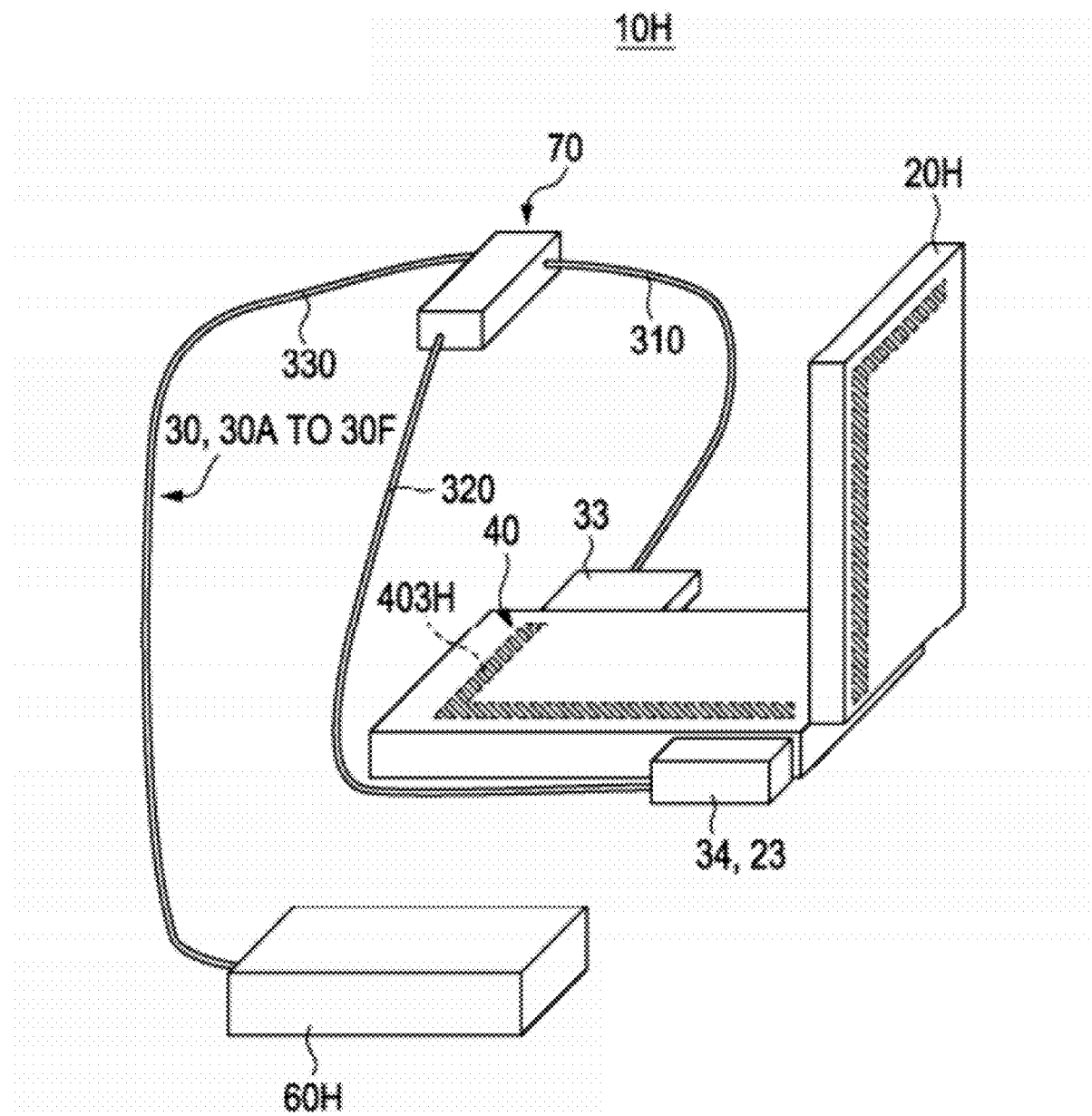
FIG. 29 is a diagram illustrating an eighth applied example of the receiving apparatus according to the first embodiment other than the television receiver.

FIG. 29 is a diagram illustrating an eighth applied example of the receiving apparatus according to the first embodiment other than the television receiver.

A receiving apparatus 10H in FIG. 29 corresponds to an applied second example to a cellular phone serving as an electronic device 20H.

In this example, an inside antenna 403H is applied as the first antenna 40.

An AC adapter 60H is applied as the power source.

In this way, the receiving apparatus 10 according to the first embodiment is applicable to the in-vehicle portable electronic device. Moreover, since the above-described advantages are obtained, the broadcast waves may be received in an optimum way.

In the first embodiment, the power transmission cables 30 and 30A to 30F are diverged in the divergence section (the relay section) and the second antenna is formed as the dipole antenna.

Hereinafter, examples where the second antenna is formed as a monopole antenna without divergence of the power transmission cable will be described as second to fifth embodiments.

2. Second Embodiment

Figure 30:
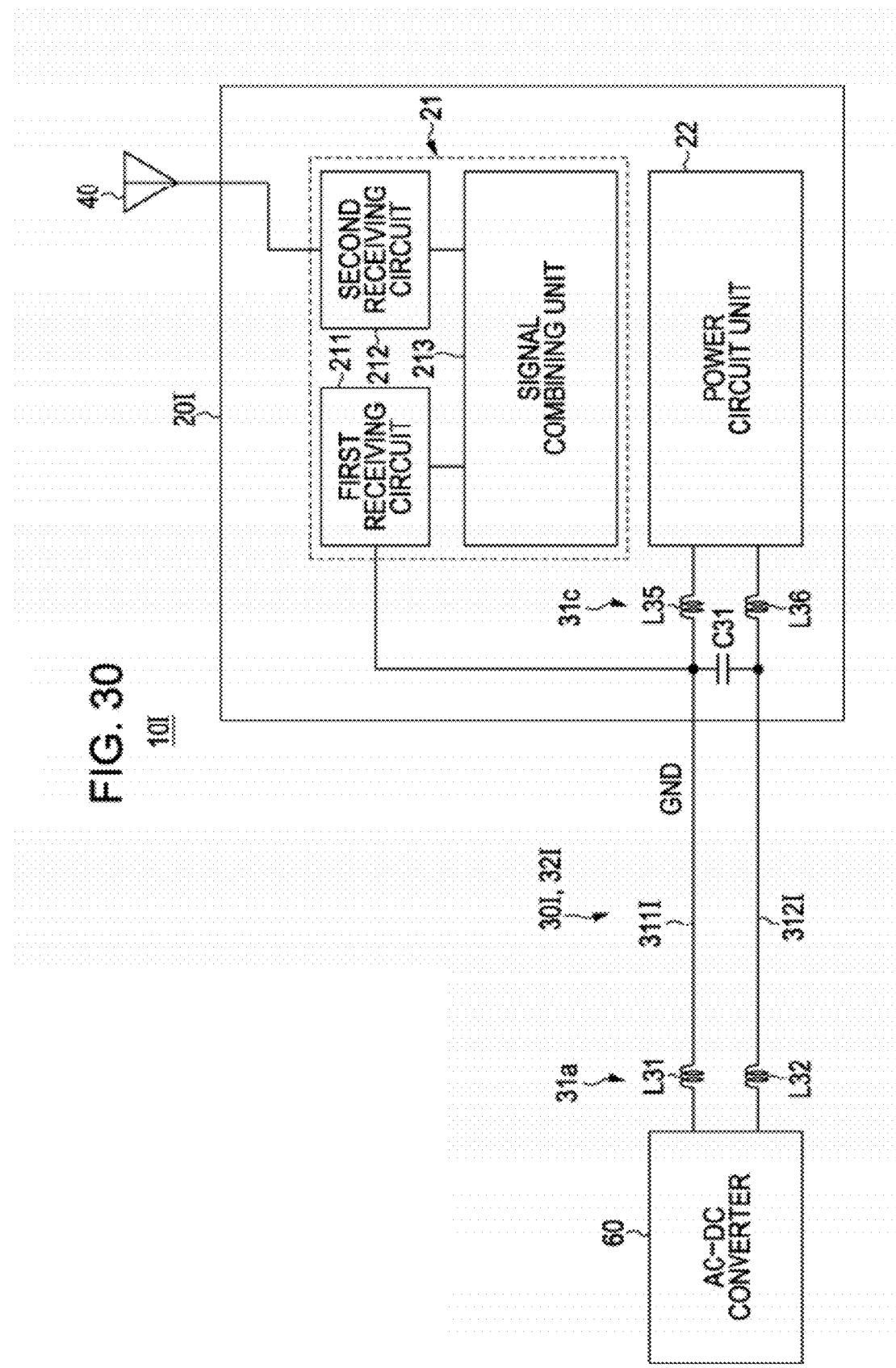
FIG. 30 is a diagram illustrating the circuit configuration of a receiving apparatus according to a second embodiment of the invention.

FIG. 30 is a diagram illustrating the circuit configuration of a receiving apparatus according to a second embodiment of the invention.

A difference between a receiving apparatus 10I according to the second embodiment and the receiving apparatus 10 according to the first embodiment is that a second antenna 32I is formed as a monopole antenna without divergence of a power transmission cable 30I.

In the power transmission cable 30I according to the second embodiment, inductors L31 and L32 formed by two parallel lines 311I and 312I and serving as a high-frequency blocking section 31a are disposed on the side of the AC-DC converter 60.

In an electronic device 20I according to the second embodiment, in order to separate the high-frequency signal caused by the power transmission cable 30I from the power, inductors L35 and L36 serving as a high-frequency blocking section 31c are formed in series on a board including the power circuit 22 connected to the two parallel lines 311I and 312I.

The two parallel lines 311I and 312I are capacity-coupled in parallel, are drawn than the ground GND of the power circuit 22, and are connected to the first receiving circuit 211 of the diversity processor 21.

As described above, the inductors L31 and L32 serving as the high-frequency blocking section are separated at high frequency so as to be disposed in series in the AC-DC converter 60 or in the relay section of the power transmission line and function as an antenna.

The separated portions of the inductors L31 and L32 and the inductors L35 and L36 on the AC-DC converter 60 and the electronic device 20I function as the second antenna 32I. It is effective to set the length of the portions to λ/2 or more of a desired reception frequency.

Here, the wavelength of the monopole second antenna 32I which does not depend on the set ground GND of the electronic device 20I will be examined.

FIGS. 31A and 31B are diagrams illustrating a first example of the wavelength of the monopole second antenna 32I which does not depend on the set ground GND of the electronic device 20I.

Figure 32B:
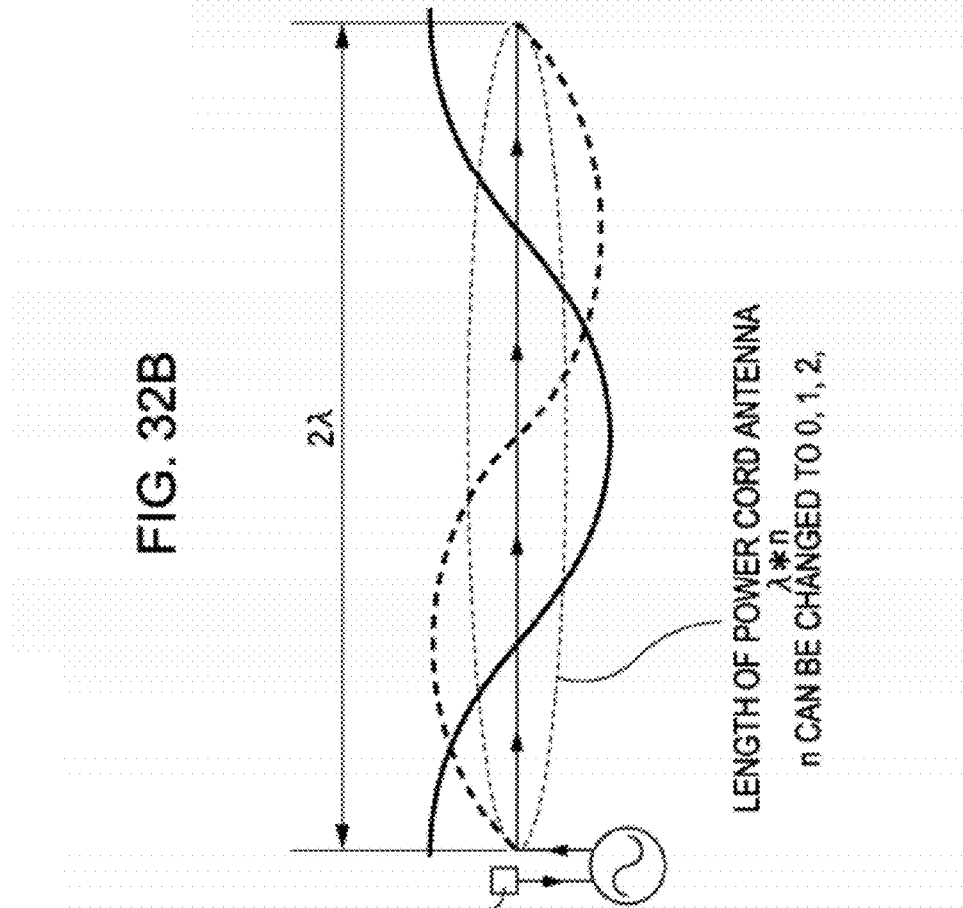
FIGS. 32A and 32B are diagrams illustrating a second example of the wavelength of the monopole second antenna which does not depend on the set ground of the electronic device.
Figure 32A:
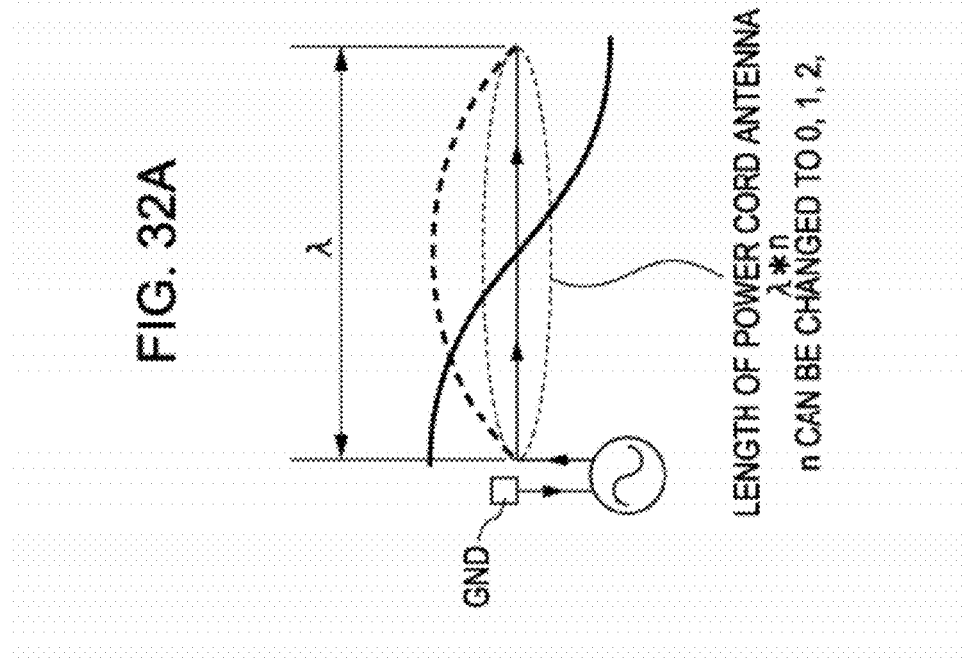

FIGS. 32A and 32B are diagrams illustrating a second example of the wavelength of the monopole second antenna 32I which does not depend on the set ground GND of the electronic device 20I.

In a current feeding case, a method of changing a current balance may be used as a method of reducing a correlation efficient between the first antenna 40 set in the electronic device 20I and the second antenna 32I formed by the power transmission cable (power cord).

As shown in FIGS. 31A and 31B, the position of a feeding point with the set ground GND is delayed by λ/4 and the set ground GND and the power transmission cable (power cord) are set to λ/8 and the 3λ/8, respectively, so that the current portion is not shared by the first antenna 40 of the set main body.

In a case of λ/2, as shown in FIG. 31A, the length of the second antenna which is the power cord antenna is set to 3λ/8.

In a case of λ, as shown in FIG. 31B, the length of the second antenna which is the power cord antenna is set to {3λ/8+λ/2*n}, where n can be changed to an integer including 0.

In the current feeding case, there is no influence from the set ground GND. The wavelength of the current is adjusted so as to become 0 at the feeding point of the antenna, as shown in FIGS. 32A and 32B.

In this case, since the set ground GND is not used, the correlation coefficient with the first antenna 40 of the set main body becomes considerably small.

The receiving apparatus 10I according to the second embodiment may improve the correlation coefficient between the antennas and may improve the portability by function complexity.

In this way, according to the second embodiment, it is possible to improve the convenience of the receiving apparatus and the reception sensibility.

In the receiving apparatus 10I according to the second embodiment, by forming the monopole antenna in the power cable, it is possible to realize the antenna configuration where the influence of other antennas of the receiving apparatus is small and the diversity effect is readily obtained.

According to the second embodiment, the same advantages as those of the receiving apparatus 10 according the above-described first embodiment may be obtained.

3. Third Embodiment

Figure 33:
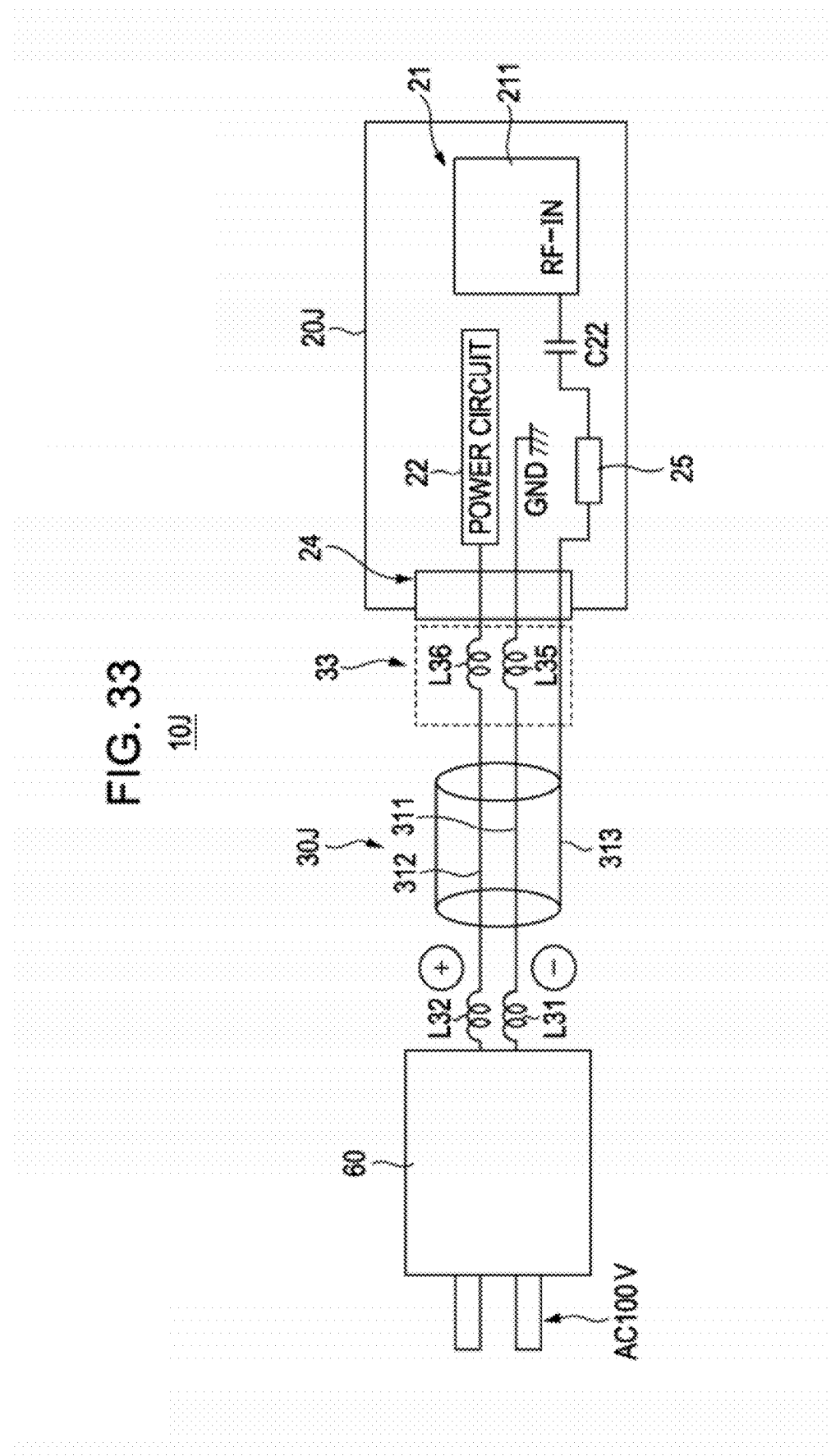
FIG. 33 is a diagram illustrating the circuit configuration of a receiving apparatus according to a third embodiment of the invention.

FIG. 33 is a diagram illustrating the circuit configuration of a receiving apparatus according to a third embodiment of the invention.

A difference between a receiving apparatus 10J according to the third embodiment and the receiving apparatus 10I according to the second embodiment is that a power transmission cable 30J is formed by two shield-attached lines and a braided shield portion 313 is configured as an antenna.

A signal line 312 is connected to the power circuit 22 via an inductor L36. A signal line 311 is connected to the set ground GND.

The shield portion 313 of the power transmission cable 30J is connected to the first receiving circuit 211 of the diversity processor (tuner) 21 via a matching circuit 25 and C22.

In the receiving apparatus 10J in FIG. 33, since isolation is further achieved by separating a DC circuit and an RF circuit each other physically, it is possible to reduce the influence of a power noise or the like.

4. Fourth Embodiment

FIG. 34 is a diagram illustrating the circuit configuration of a receiving apparatus according to a fourth embodiment of the invention.

A difference between a receiving apparatus 10K according to the fourth embodiment and the receiving apparatus 10J according to the third embodiment is that the braided shield portion 313 and the signal line 311 are connected to each other to form an antenna.

In the receiving apparatus 10K in FIG. 34, more harmonic resonance may be achieved by using resonance occurring by braiding and resonance occurring by an inner conducting member.

Since the high frequency of F1 (first resonance) and the harmonic of F2 (second resonance) occur, an advantage of reducing a null point of the UHF band may be obtained.

5. Fifth Embodiment

FIG. 35 is a diagram illustrating the circuit configuration of a receiving apparatus according to a fifth embodiment of the invention.

A difference between a receiving apparatus 10L according to the fifth embodiment and the receiving apparatus 10J according to the third embodiment is that two ferrite cores (or ferrite beads) 314 and 315 are disposed in a power transmission cable 30L.

In the receiving apparatus 10L in FIG. 35, by disposing the two ferrite cores or the ferrite beads, it is possible to obtain advantages of further intensifying the function of the high frequency blocking section and being effective regarding power noise (a noise source of 30 MHz or less).

The receiving apparatuses 10I to 10L in which the second antenna 32I is formed as the monopole antenna according to the second to fifth embodiments are applicable to the various electronic devices shown in FIGS. 22 to 29, like the receiving apparatus 10 according to the first embodiment.

In both the dipole antenna and the monopole antenna, reception sensibility of the second antenna is higher in a method of extending the power transmission cables 30 to 30L than in a method of winding the power transmission cables 30 to 30L at the use time.

Hereinafter, the method of winding the power transmission cables 30 to 30L at the use time and the method of extending the power transmission cables 30 to 30L at the use time will be examined when the monopole antenna is used as the second antenna.

FIGS. 36A and 36B and FIGS. 37A and 37B are diagrams illustrating the characteristics of the peak gain with respect to the frequency of the receiving apparatus in states where the power transmission cable functioning as the monopole second antenna according to the embodiments extends and is wound.

FIG. 36A shows the characteristics in the VHF band in the state where the power transmission cable extends. FIG. 36B shows the characteristics in the VHF band in the state where the power transmission cable is wound.

Figure 37B:
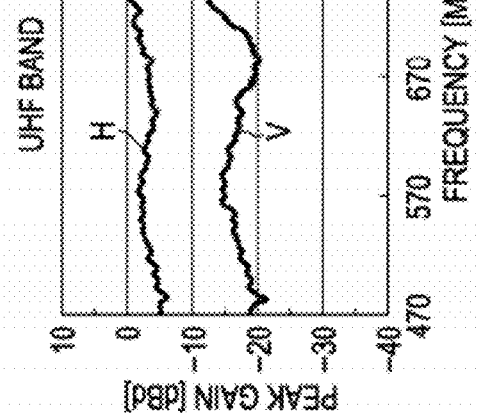
FIGS. 37A and 37B are diagrams illustrating the characteristics of the peak gain with respect to the frequency of the UHF band of the receiving apparatus in states where the power transmission cable functioning as the monopole second antenna according to the embodiments extends and is wound.
Figure 37A:
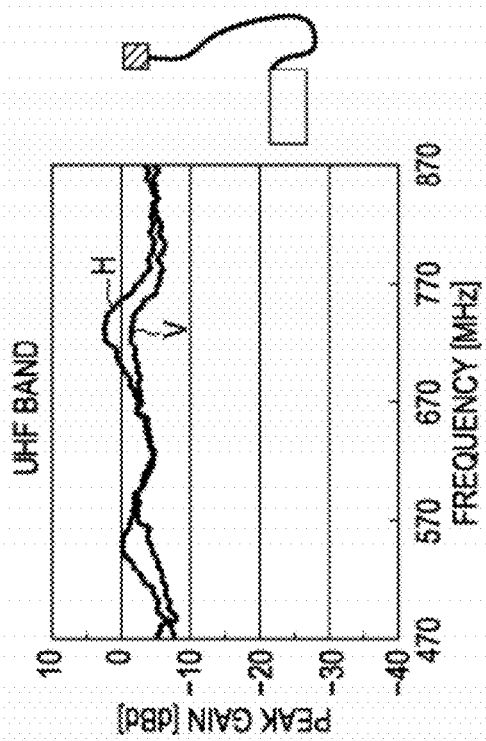

FIG. 37A shows the characteristics in the UHF band in the state where the power transmission cable extends. FIG. 37B shows the characteristics in the UHF band in the state where the power transmission cable is wound.

In FIGS. 36A and 36B and FIGS. 37A and 37B, curves indicated by H show the characteristics of horizontal polarization and curves indicated by V show the characteristics of vertical polarization.

FIGS. 36A and 36B and FIGS. 37A and 37B illustrate tables showing the measurement results in detail in accordance with the characteristics.

As is evident from these drawings, the reception sensitivity of the monopole second antenna is higher in the method of extending the power transmission cables 30 to 30L at the use time than in the method of winding the power transmission cables 30 to 30L at the use time.

It can easily be inferred that the same measurement result is obtained even in the dipole antenna.

That is, in both the dipole antenna and the monopole antenna, the reception sensitivity of the second antenna is higher in the method of extending the power transmission cables 30 to 30L at the use time than in the method of winding the power transmission cables 30 to 30L at the use time.

Accordingly, when the receiving apparatuses 10 to 10L according to the first to fifth embodiments are applied to various electronic devices, it is preferable to provide a holding member which maintains and holds at least the portion serving as the second antenna in the power transmission cables 30 to 30L with a straight shape.

For example, the holding member is attached to the inside of a vehicle. Of course, the holding member may be formed in various shapes such a hook shape.

The present application contains subject matter related to that disclosed in Japanese Priority Patent Application JP 2009-072556 filed in the Japan Patent Office on Mar. 24, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A receiving apparatus comprising:
   an electronic device;
   a first antenna, which is provided so as to be separate from a main body of the electronic device, to receive broadcast waves; and
   a power transmission cable to transmit power to the electronic device,
   wherein in the power transmission cable, a high-frequency blocking section is disposed on a side of a power source, and at least a part of the power transmission cable functions as a second antenna receiving a broadcast wave, and
   wherein the electronic device includes a diversity processor executing a diversity process on a signal received by the first antenna and a signal received by the second antenna.

2. The receiving apparatus according to claim 1,
   wherein the second antenna is formed by the power transmission cable and a ground of the main body of the electronic device and the second antenna is connected to the diversity processor, and
   wherein the high-frequency blocking section is disposed on the side of a power unit of the electronic device.

3. The receiving apparatus according to claim 2, wherein the power transmission cable is formed by two parallel lines and one line closer to the power source than the high-frequency blocking section disposed on the side of the power unit of the electronic device is connected to the diversity processor.

4. The receiving apparatus according to claim 3, wherein in the second antenna, the two parallel lines are capacity-coupled so as to be closer to the power source than the high-frequency blocking section disposed on the side of the power unit of the electronic device and are connected to the diversity processor by a ground line of the power unit.

5. The receiving apparatus according to claim 2,
   wherein the power transmission cable is formed by two lines with the shield portion,
   wherein one of the two lines is connected to the power unit via the high-frequency blocking section of the electronic device,
   wherein an other of the two lines is connected to the ground via the high-frequency blocking section of the electronic device, and
   wherein the shield portion is connected to the diversity processor via a matching circuit.

6. The receiving apparatus according to claim 5, wherein the shield portion is connected to the other of the two lines.

7. The receiving apparatus according to claim 5 or 6, wherein the high-frequency blocking section is disposed on a side of the shield portion.

8. The receiving apparatus according to claim 1,
   wherein the power transmission cable is diverged into first and second divergence cables at a divergence section formed between the power source and the electronic device,
   wherein the first divergence cable is connected to a power unit of the electronic device and the second divergence cable is connected as a high-frequency signal transmission line to the diversity processor, and
   wherein the second antenna has a dipole structure formed by a power source side cable closer to the power source with reference to the divergence section and the first divergence cable.

9. The receiving apparatus according to claim 8, wherein the high-frequency blocking section is disposed in the power source side cable close to the power source, the first divergence cable close to the electronic device, or the divergence section of the power source side cable and the first divergence cable.

10. The receiving apparatus according to claim 8, wherein the second divergence cable is connected to the power source side cable and the first divergence cable via a balanced-to-unbalanced transformer.

11. The receiving apparatus according to claim 8 or 10,
    wherein the power source side cable and the first divergence cable of the power transmission cable are each formed by two lines with a shield portion,
    wherein the second divergence cable is formed by a coaxial cable in which a core line and a shield portion are formed coaxially, and
    wherein the core line is connected to the shield portion of the power source side cable and the shield portion is connected to the shield portion of the first divergence cable.

12. The receiving apparatus according to claim 8 or 10,
    wherein the power source side cable and the first divergence cable of the power transmission cable are each formed by two parallel lines, wherein the second divergence cable is formed by a coaxial cable in which a core line and a shield portion are formed coaxially, and wherein the core line is connected to one line of the power source side cable and the shield portion is connected to one line of the first divergence cable.

13. The receiving apparatus according to claim 12, wherein one line of the first divergence cable is connected to a ground of the electronic device.

* * * * *